United States Patent
Zhang et al.

(10) Patent No.: US 11,393,206 B2
(45) Date of Patent: Jul. 19, 2022

(54) IMAGE RECOGNITION METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Kaihao Zhang, Shenzhen (CN); Wenhan Luo, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 77 days.

(21) Appl. No.: 16/894,576

(22) Filed: Jun. 5, 2020

(65) Prior Publication Data

US 2020/0302180 A1    Sep. 24, 2020

Related U.S. Application Data

(63) Continuation of application No. PCT/CN2019/075450, filed on Feb. 19, 2019.

(30) Foreign Application Priority Data

Mar. 13, 2018    (CN) .......................... 201810206459.5

(51) Int. Cl.
*G06V 20/40* (2022.01)
*G06T 7/70* (2017.01)
(Continued)

(52) U.S. Cl.
CPC ........... *G06V 20/41* (2022.01); *G06K 9/6217* (2013.01); *G06K 9/6267* (2013.01); *G06N 3/02* (2013.01);
(Continued)

(58) Field of Classification Search
CPC ........... G06K 9/00718; G06K 9/00302; G06K 9/00744; G06K 9/00758; G06K 9/6217;
(Continued)

(56) References Cited

U.S. PATENT DOCUMENTS 9,507,997 B2 * 11/2016 Phan .................... G06Q 30/016
2016/0321671 A1 * 11/2016 Chandrasekaran .. G06Q 20/202
(Continued)

FOREIGN PATENT DOCUMENTS

CN    105139039 A    12/2015
CN    105469065    *   4/2016  ......... G06K 9/00315
(Continued)

OTHER PUBLICATIONS

Kaihao et al, ("Facial Expression Recognition Based on Deep Evolutional Spatial-Temporal Networks", IEEE Transactions on image processing, vol. 26, No. 9, Sep. 2017). (Year: 2017).*
(Continued)

*Primary Examiner* — Amara Abdi
(74) *Attorney, Agent, or Firm* — Anova Law Group, PLLC

(57) ABSTRACT

An image recognition method is provided, including: obtaining a target video including a target object; extracting a target video frame image from the target video; generating a key point video frame sequence comprised of a plurality of key point video frames according to key point information of the object and a plurality of video frames in the target video; extracting dynamic timing feature information of the key point video frame sequence; extracting static structural feature information of the target video frame image; and recognizing an attribute type corresponding to the target object in the target video according to the dynamic timing
(Continued)

feature information of the key point video frame sequence and the static structural feature information of the target video frame image.

20 Claims, 10 Drawing Sheets

(51) Int. Cl.
*G06K 9/62* (2022.01)
*G06N 3/02* (2006.01)
*G06V 40/16* (2022.01)

(52) U.S. Cl.
CPC ............... *G06T 7/70* (2017.01); *G06V 20/46* (2022.01); *G06V 20/48* (2022.01); *G06V 40/174* (2022.01); *G06T 2207/10016* (2013.01); *G06T 2207/20084* (2013.01); *G06T 2207/30204* (2013.01)

(58) Field of Classification Search
CPC ............ G06K 9/6267; G06K 9/00315; G06K 9/00268; G06K 9/00288; G06K 9/6271; G06T 7/70; G06T 2207/10016; G06T 2207/20084; G06T 2207/30204; G06N 3/02; G06N 3/0454; G06N 3/0445; G06N 3/08; G06V 20/41; G06V 20/46; G06V 20/48; G06V 40/174; G06V 10/82; G06V 40/175; G06V 40/176; G06V 40/168; G06V 40/172
See application file for complete search history.

(56) References Cited

U.S. PATENT DOCUMENTS

| 2018/0018970 | A1 | 1/2018 | Heyl et al. |
| 2018/0204132 | A1* | 7/2018 | Liang .................. G06T 7/0004 |
| 2018/0239975 | A1* | 8/2018 | Tamrakar ............. G06V 40/171 |
| 2019/0311188 | A1* | 10/2019 | Qing .................... G06V 40/176 |
| 2021/0256979 | A1* | 8/2021 | Zhang ..................... G10L 17/06 |

FOREIGN PATENT DOCUMENTS

| CN | 106447625 | A | | 2/2017 | |
| CN | 106599824 | A | | 4/2017 | |
| CN | 106599907 | | * | 4/2017 | ........... G06K 9/6256 |
| CN | 106599907 | A | | 4/2017 | |
| CN | 107403142 | | * | 11/2017 | ......... G06K 9/00281 |
| CN | 107403142 | A | | 11/2017 | |
| CN | 108388876 | A | | 8/2018 | |

OTHER PUBLICATIONS

The World Intellectual Property Organization (WIPO) International Search Report for PCT/CN2019/075450 dated May 27, 2019 5 Pages (including translation).
The State Intellectual Property Office of the People's Republic of China (SIPO) Office Action 1 for for 201810206459.5 Sep. 06, 2021 15 Pages (including translation).
Zhen Lu, "Research on facial expression recognition technology based on video," China Excellent Doctoral and Master's Thesis Full-text Database (Master) Information Technology Series, Jul. 15, 2014 (Jul. 15, 2014). 75 pages.
Shuang Tang, "Micro-expression recognition based on deep neural network," Electronic Technology and Software Engineering, Feb. 15, 2017 (Feb. 15, 2017). 4 pages.
The European Patent Office (EPO) The Extended European Search Report for 19768544.9 Nov. 10, 2021 10 Pages.
Kaihao Zhang et al. "Facial Expression Recognition Based on Deep Evolutional Spatial-Temporal Networks," IEEE Transactions on Image Processing, vol. 16, No. 9, Sep. 1, 2017, pp. 4193-4203. 11 pages.

* cited by examiner

IMAGE RECOGNITION METHOD AND APPARATUS, TERMINAL, AND STORAGE MEDIUM

CROSS-REFERENCES TO RELATED APPLICATIONS

This application is a continuation application of PCT Patent Application No. PCT/CN2019/075450, filed on Feb. 19, 2019, claims priority to Chinese Patent Application No. 201810206459.5, entitled "IMAGE RECOGNITION METHOD AND APPARATUS, AND RELATED DEVICE" filed with the Chinese Patent Office on Mar. 13, 2018, the entire contents of both of which are incorporated herein by reference.

FIELD OF TECHNOLOGY

The present disclosure relates to the field of computer technologies, and in particular, to an image recognition method and apparatus, a terminal, and a storage medium.

BACKGROUND OF THE DISCLOSURE

Facial expressions are important means for people to perform non-verbal communication. The expressions include rich behavioral information, and are a main carrier of emotions, as well as an important supplement to verbal communication. Through recognition on the facial expressions, corresponding psychological or emotional states may be further understood. In an actual application, facial expression recognition may be applied to fields such as distance learning, intelligent robots, safe driving, therapy assistance, and sentiment analysis and computation.

Existing facial expression recognition techniques mainly include extracting spatial structural feature information of a single facial image/facial expression video by using deep learning, and further recognizing an expression type of the facial image/facial expression video according to the extracted spatial structural feature information. However, the spatial structural feature information includes very limited expression information, and is easily affected by an external environment and individual differences. In addition, to accurately recognize a corresponding expression type, an expression in a to-be-recognized facial image/facial expression video needs to be very obvious. Because generation and disappearance of an expression is a changing procedure, if facial expression analysis is only relied on a static feature of the facial image/facial expression video, the corresponding expression type cannot be accurately determined.

It can be learned from the foregoing that when a facial image/facial expression video is analyzed according to monotonous spatial structural feature information, a type of a facial expression in the facial image/facial expression video cannot be accurately recognized.

SUMMARY

According to embodiments disclosed in the present disclosure, an image recognition method is provided.

An image recognition method is provided, including: obtaining a target video including a target object; extracting a target video frame image from the target video; generating a key point video frame sequence comprised of a plurality of key point video frames according to key point information of the object and a plurality of video frames in the target video; extracting dynamic timing feature information of the key point video frame sequence; extracting static structural feature information of the target video frame image; and recognizing an attribute type corresponding to a motion or an expression of the target object presented in the target video according to the dynamic timing feature information of the key point video frame sequence and the static structural feature information of the target video frame image.

An image recognition apparatus is provided, including: a memory and a processor coupled to the memory. The processor is configured to obtain a target video including a target object; extract a target video frame image from the target video; generate a key point video frame sequence comprised of a plurality of key point video frames according to key point information of the object and a plurality of video frames in the target video; extract dynamic timing feature information of the key point video frame sequence; extract static structural feature information of the target video frame image by using a convolutional neural network model; and recognize an attribute type corresponding to a motion or an expression of the target object presented in the target video according to the dynamic timing feature information of the key point video frame sequence and the static structural feature information of the target video frame image.

A non-transitory computer-readable storage medium is provided, storing a computer-readable instruction, the computer-readable instruction, when executed by one or more processors, causing the one or more processors to perform: obtaining a target video including a target object; extracting a target video frame image from the target video; generating a key point video frame sequence comprised of a plurality of key point video frames according to key point information of the object and a plurality of video frames in the target video; extracting dynamic timing feature information of the key point video frame sequence; extracting static structural feature information of the target video frame image; and recognizing an attribute type corresponding to a motion or an expression of the target object presented in the target video according to the dynamic timing feature information of the key point video frame sequence and the static structural feature information of the target video frame image.

BRIEF DESCRIPTION OF THE DRAWINGS

To describe the technical solutions in the embodiments of the present disclosure or in the related art more clearly, the following briefly introduces the accompanying drawings for describing the embodiments or the prior art. Apparently, the accompanying drawings in the following description show merely some embodiments of the present disclosure, and a person of ordinary skill in the art may still derive other drawings from the accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
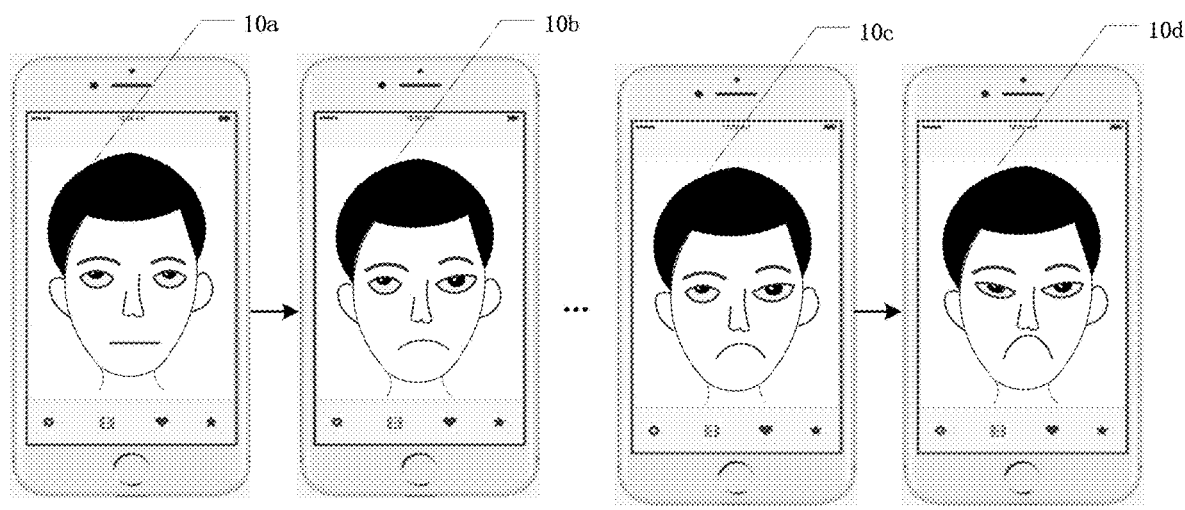
FIG. 1 is a schematic diagram of a scenario of an image recognition method according to an embodiment of the present disclosure.
Figure 2:
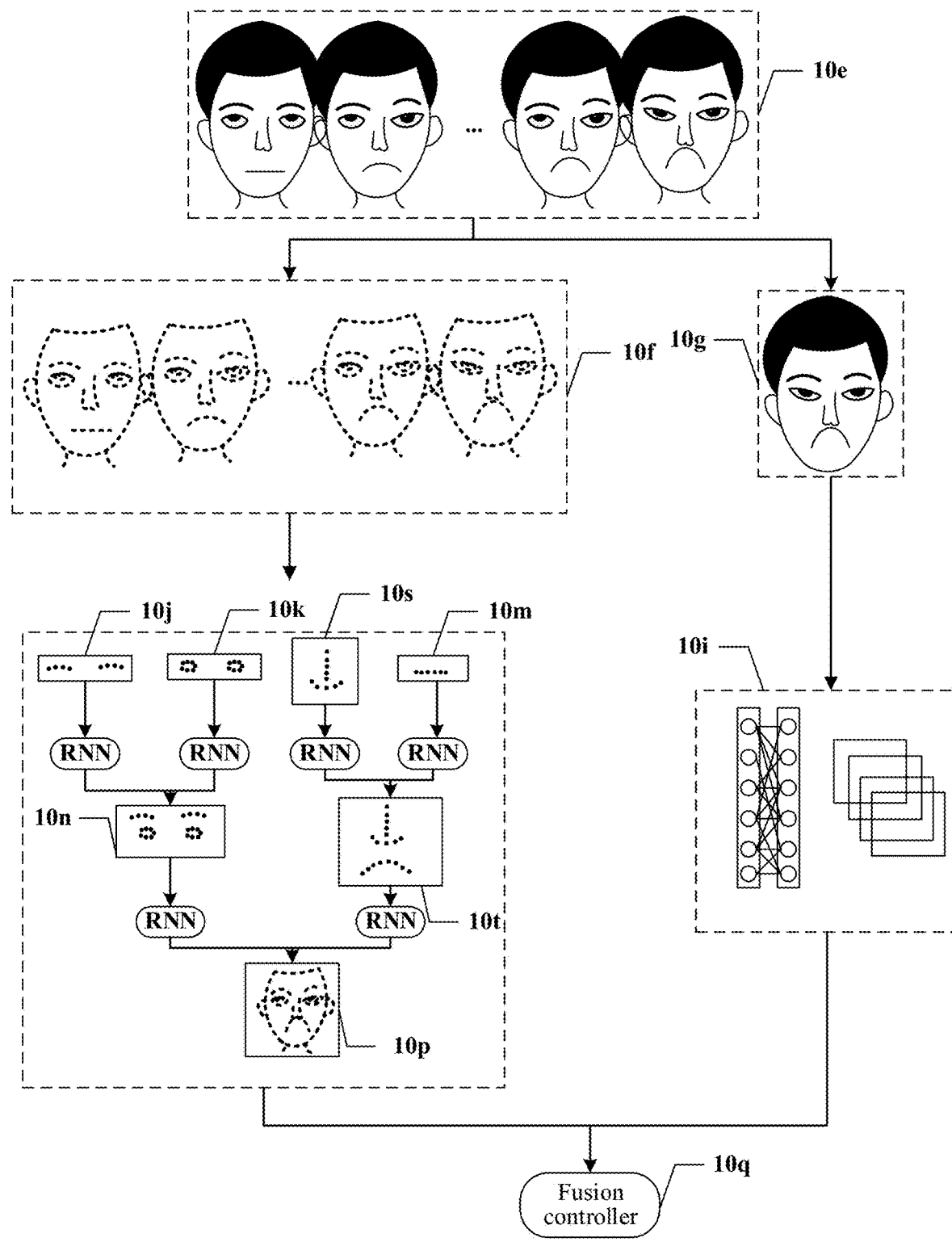
FIG. 2 is a schematic diagram of a scenario of an image recognition method according to another embodiment of the present disclosure.

FIG. 1 and FIG. 2 are schematic diagrams of scenarios of an image recognition method according to an embodiment of the present disclosure. As shown in FIG. 1, a user enables a front-facing camera and a video recording function in a smartphone for recording a video of a facial expression. In a procedure of collecting a video, first, deformation degrees of facial features in a video frame image 10a in a collected video, for example, whether muscles around eyes contract, whether a distance between eyebrows is reduced, and an amplitude at which corners of a mouth are turned upward or downward, are detected. Because the deformation degrees of the facial features in the video frame image 10a are not large, that is, a facial expression in the video frame image 10a is not obvious, the user continuously records the expression video, and a terminal continues to detect deformation degrees of facial features in a video frame image 10b in the collected video. Similarly, the deformation degrees of the facial features in the video frame image 10b are relatively small, and a facial expression in the video frame image 10b is still not obvious. The terminal continuously collects the expression video, and continuously detects image frames of the collected video. Deformation degrees of facial features in a video frame image 10c in the collected video are detected. Although corners of a mouth in the video frame image 10c are turned down, an entire facial expression in the video frame image 10c is still not obvious. The terminal continues to detect facial features in a video frame image 10d in the collected video. Because in the video frame image 10d, muscles around eyes strongly contract, and an amplitude at which the corners of the mouth are turned down is large, it may be determined that a facial expression in the video frame image 10d is obvious. Next, expression analysis is performed on the collected video. As shown in FIG. 2, the video frame image 10a, the video frame image 10b, . . . , the video frame image 10c, and the video frame image 10d in the recorded video are combined, to obtain a video frame image sequence 10e. The last frame of video frame image (that is, the video frame image 10d) is extracted from the video frame image sequence 10e, and a facial image is segmented from the last frame of video frame image, to obtain a target image 10g.

All the video frame images in the video frame image sequence 10e are converted into a key point video frame sequence 10f according to key point information of the face. That is, the video frame image 10a, the video frame image 10b, . . . , the video frame image 10c, and the video frame image 10d are respectively converted into key point video frame images, and then, the key point video frame images are combined into the key point video frame sequence 10f. According to areas in which the facial features are located, in all the key point video frame images in the key point video frame sequence 10f, all areas in which eyebrows are located are combined into an eyebrow video frame sequence 10j, all areas in which eyes are located are combined into an eye video frame sequence 10k, all areas in which a nose is located are combined into a nose video frame sequence 10l, and all areas in which a mouth is located are combined into a mouth video frame sequence 10m. Local dynamic timing feature information of the eyebrow video frame sequence 10j and local dynamic timing feature information of the eye video frame sequence 10k are extracted by using a recurrent neural network (RNN) model, and the two pieces of local dynamic timing feature information are combined, to obtain local dynamic timing feature information 10n of the eyebrows-eyes. Similarly, local dynamic timing feature information of the nose video frame sequence 10l and local dynamic timing feature information of the mouth video frame sequence 10m are extracted by using the RNN model, and the two pieces of local dynamic timing feature information are combined, to obtain local dynamic timing feature information 10t of the nose-mouth. Then, global dynamic timing feature information of the local dynamic timing feature information 10n of the eyebrows-eyes and global dynamic timing feature information of the local dynamic timing feature information 10t of the nose-mouth are extracted by using the RNN model. The two pieces of global dynamic timing feature information are combined, to obtain dynamic timing feature information 10p of the face. Probabilities that the dynamic timing feature information 10p of the face matches features of six basic expressions (happiness, sadness, surprise, fear, disgust, anger) are calculated by using a classifier in the RNN model, and are respectively: 0.03 for happiness, 0.7 for sadness, 0.02 for surprise, 0.1 for fear, 0.1 for disgust, and 0.05 for anger. The values represent the probabilities that the dynamic timing feature information 10p of the face matches the features of the six basic expressions.

The target image 10g is inputted into an input layer of a convolutional neural network 10i, and static structural feature information of the target image 10g is extracted by using a convolution operation and a pooling operation in the convolutional neural network 10i. Probabilities that the static structural feature information of the target image 10g matches the features of the six basic expressions are calculated by using a classifier in the convolutional neural network 10i, and are respectively: 0.02 for happiness, 0.75 for sadness, 0.03 for surprise, 0.05 for fear, 0.05 for disgust, and 0.1 for anger. The values represent the probabilities that the static structural feature information of the target image 10g matches the features of the six basic expressions. Finally, the probabilities that the dynamic timing feature information 10p of the face matches the features of the six basic expressions and the probabilities that the static structural feature information of the target image 10g matches the features of the six basic expressions are fused by using a fusion controller 10q, that is, weighted averaging is performed on the probabilities of the same basic expressions, to obtain: (0.03 for happiness+0.02 for happiness)/2=0.025 for happiness, (0.7 for sadness+0.75 for sadness)/2=0.725 for sadness, (0.02 for surprise+0.03 surprise)/2=0.025 for surprise, (0.1 for fear+0.05 fear)/2=0.075 fear, (0.1 disgust+0.05 for disgust)/2=0.075 for disgust, and (0.05 for anger+0.1 for anger)/2=0.075 for anger. Therefore, an attribute type corresponding to the facial expression in the recorded video is: sadness (0.725 for sadness>0.075 for fear=0.075 for disgust=0.075 for anger>0.025 for happiness=0.025 for surprise). For a next frame of image of the video frame image 10d, deformation degrees of facial features in the next frame of image may alternatively be continuously detected. Further, an attribute type corresponding to the video including the next frame of image and a probability corresponding to the attribute type are calculated. If the attribute type obtained through the calculation is the same as a preset attribute type, and the probability corresponding to the attribute type is greater than a preset probability threshold, the terminal performs a corresponding operation. For example, if the attribute type obtained through the calculation is: sadness, and a probability corresponding to the attribute type "sadness" is 0.85, the terminal performs a payment operation or a photographing operation.

For specific procedures of extracting the feature information and recognizing the attribute type corresponding to the target object in the video, refer to the following embodiments corresponding to FIG. 3 to FIG. 8.

Figure 3:
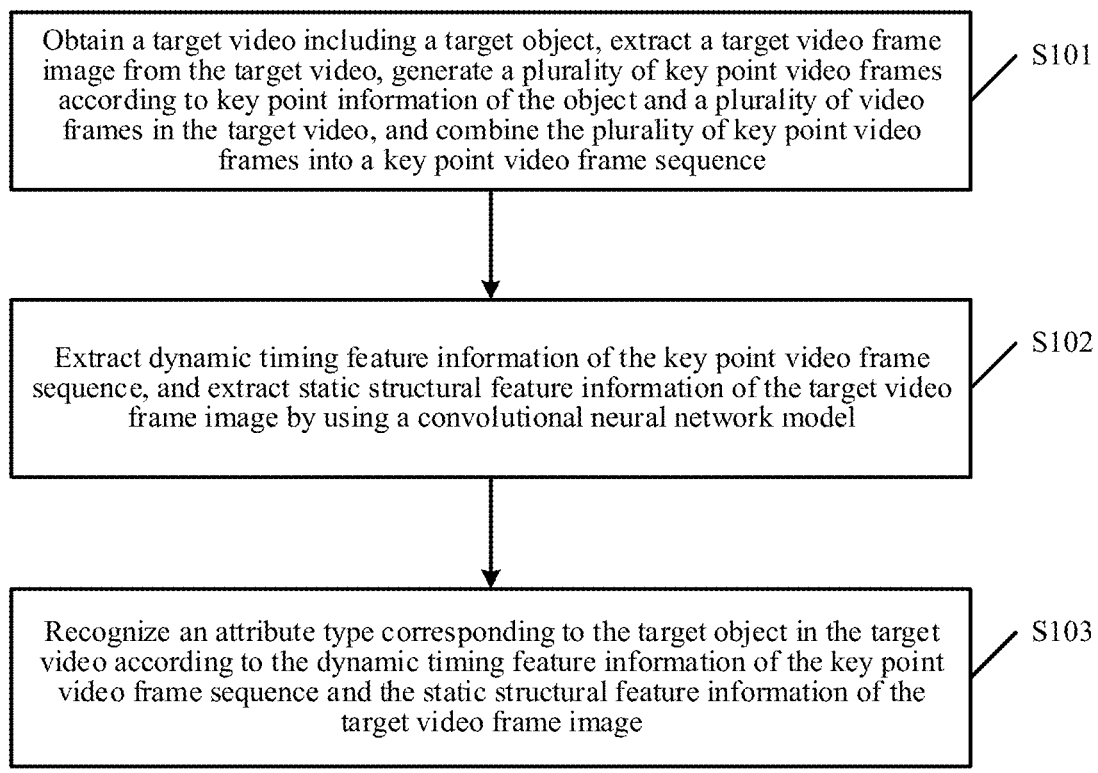
FIG. 3 is a schematic flowchart of an image recognition method according to an embodiment of the present disclosure.

Further, FIG. 3 is a schematic flowchart of an image recognition method according to an embodiment of the present disclosure. Description is made by using an example in which the method is applied to the terminal in FIG. 1. As shown in FIG. 3, the image recognition method may include the following steps.

Step S101: Obtain a target video including a target object; extract a target video frame image from the target video; generate a plurality of key point video frames according to key point information of the object and a plurality of video frames in the target video, and combine the plurality of key point video frames into a key point video frame sequence.

Specifically, a video including a target object is obtained as a target video. The target object may include: a species such as a human, an animal, or a plant. Because the video includes a plurality of frames of consecutive images, the target object is included in all the plurality of frames of consecutive images in the target video. Any frame of image is extracted from the target video as a target video frame image (for example, the target image 10g in the embodiment corresponding to FIG. 3). Because feature information of the target video frame image needs to be extracted in the following, a feature of the target object in the target video frame image needs to be obvious. Therefore, the last frame of image or an image close to the last frame of image may be extracted from the target video as the target video frame image. Video frames in the target video are converted into key point video frames according to key point information of the target object in the target video. The key point information is marker parts capable of representing the target object. For example, when the target object is a puppy, the key point information is iconic parts such as a tail, four limbs, and ears of the puppy; and when the target object is a human, the key point information is iconic parts of a face such as eyebrows, eyes, and a nose. The key point video frames are video frames including a plurality of discrete dots in iconic areas of the target object. All the key point video frames are combined into a key point video frame sequence (such as the key point video frame sequence 10f in the foregoing embodiment corresponding to FIG. 3) according to a chronological sequence of the key point video frames. The key point video frame sequence not only includes static structural feature information of the target object, but also includes dynamic timing feature information between the plurality of key point video frames.

Step S102: Extract dynamic timing feature information of the key point video frame sequence; and extract static structural feature information of the target video frame image by using a convolutional neural network model.

Specifically, key marker areas are extracted from each key point video frame in the key point video frame sequence. The key marker areas are areas representing target object features in the key point video frames (for example, when the target object is a person, an area in which the eyes are located, an area in which a nose is located, and the like are the key marker areas). Same key marker areas in all the key point video frames are respectively combined into unit key point video frame sequences (such as the eyebrow video frame sequence 10j, the eye video frame sequence 10k, the nose video frame sequence 10l, and the mouth video frame sequence 10m in the foregoing embodiment corresponding to FIG. 3) according to a chronological sequence of the key point video frames. It may be learned from the foregoing that a quantity of the key marker areas is the same as a quantity of the unit key point video frame sequences. The unit key point video frame sequences are respectively inputted into an RNN model. Associativity of context texture information between a plurality of unit key point video frames in the unit key point video frame sequences may be converted into a structured circular dependency according to associativity of context texture information between the plurality of unit key point video frames and a dependency therebetween. Dynamic timing feature information of the unit key point video frame sequences is further extracted, where each unit key point video frame sequence corresponds to one piece of dynamic timing feature information. The RNN model may be represented by using a formula (1):

$$h_t = H(W_{xh}x_t + W_{hh}x_{t-1} + b_h)$$

$$z_t = O(W_{hz}h_t + b_z) \qquad (1)$$

h represents a hidden state of a current layer, z represents an output of a single hidden layer in the RNN model, $W_{xh}$, $W_{hh}$, and $W_{hz}$ are weights between an input layer and the hidden layer, $b_h$ and $b_z$ respectively represent a bias of the hidden layer and a bias of an output layer, and both H(●) and O(●) are activation functions.

The dynamic timing feature information of the unit key point video frame sequences is extracted by using the RNN model. Certainly, a model, such as a long-short term memory (LSTM) neural network model or a gated recurrent unit (GRU) model, may alternatively be configured to extract the dynamic timing feature information of the unit key point video frame sequences. The LSTM includes a self-connected memory unit, and is a model capable of calculating complex dynamic timing remote context information. The model may be represented as the following:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t) \qquad (2)$$

In the formula (2), σ(●) is a σ function. Therefore, i, f and o respectively represent an input gate, a forget gate, and an output gate. All represent weights between two gates.

After dynamic timing feature information of all the unit key point video frame sequences is obtained, pieces of dynamic timing feature information of unit key point video frame sequences corresponding to key marker areas that are close to each other in terms of location are connected according to location relationships between the key marker areas corresponding to the unit key point video frame sequences, to obtain dynamic timing feature information (such as the dynamic timing feature information 10p of the face in the foregoing embodiment corresponding to FIG. 3) of the key point video frame sequence, that is, a plurality of pieces of local dynamic timing feature information are connected to obtain global dynamic timing feature information. Alternatively, the RNN model may be used again, to extract feature information of the connected dynamic timing feature information, and connect the feature information again to obtain the dynamic timing feature information of the key point video frame sequence, that is, obtain a global feature of a higher level by using associativity between local feature information of a lower level.

To improve accuracy of subsequent target video frame image recognition, the target video frame image may be first adjusted into a fixed size, and then the target video frame image having the size adjusted is inputted into an input layer in the convolutional neural network model. The convolutional neural network model may include an input layer, a convolutional layer, a pooling layer, a fully connected layer, and an output layer. A parameter size of the input layer is equal to the size of the target video frame image having the size adjusted. After being inputted into the input layer of the convolutional neural network, the target video frame image then enters the convolutional layer. First, a small piece in the target video frame image is randomly selected as a sample, some pieces of feature information are learned of from the small sample, and then the sample is used as a window to sequentially slide through all pixel areas of the target video frame image. That is, a convolution operation is performed on the target video frame image and the feature information learned of from the sample, to obtain most distinctive feature information at different locations of the target video frame image. After the convolution operation is performed, the feature information of the target video frame image is already extracted. However, a quantity of the features extracted only through the convolution operation is large. To reduce a computational volume, a pooling operation needs to be further performed. That is, the feature information extracted from the target video frame image through the convolution operation is transmitted to the pooling layer, and aggregate statistics are collected from the extracted feature information. An order of magnitude of the statistical feature information is far lower than an order of magnitude of the feature information extracted through the convolution operation. In addition, a classification effect is improved. A common pooling method mainly includes an average pooling operation method and a maximum pooling operation method. The average pooling operation method is that a piece of average feature information is calculated from a feature information set to represent a feature of the feature information set. The maximum pooling operation method is that a piece of maximum feature information is extracted from a feature information set to represent a feature of the feature information set. Through the convolution processing of the convolutional layer and the pooling processing of the pooling layer, the static structural feature information of the target video frame image may be extracted. In addition, a quantity of the pieces of the static structural feature information is small. There may be only one convolutional layer or a plurality of convolutional layers in the convolutional neural network. Similarly, there may be only one pooling layer or a plurality of pooling layers. The dynamic timing feature information of the key point video frame sequences may be extracted before the static structural feature information of the target video frame image is extracted, or after the static structural feature information of the target video frame image is extracted. Alternatively, the two types of feature information may be simultaneously extracted.

Step S103: Recognize an attribute type corresponding to the target object in the target video according to the dynamic timing feature information of the key point video frame sequence and the static structural feature information of the target video frame image.

Specifically, matching degrees between the dynamic timing feature information of the key point video frame sequence and a plurality of attribute type features in the RNN model are recognized by using the classifier in the RNN model, and the plurality of matching degrees are associated with label information corresponding to the attribute type features, to obtain a first label information set. That is, both the matching degrees and the associated label information are included in the first label information set. The label information is an attribute type corresponding to the attribute type feature. The attribute type may be an attribute type related to a facial expression, for example, "anger", "happiness", or "fear", or may be an attribute type related to an action, for example, "walking", "jogging", or "running", or may be an attribute type related to a gesture, for example, "invitation", "approval", or "rejection". Similarly, matching degrees between the static structural feature information of the target video frame image and a plurality of attribute type features in the convolutional neural network model are recognized by using a classifier in the convolutional neural network model, and the plurality of matching degrees are associated with label information corresponding to the plurality of attribute type features, to obtain a second label information set. Similarly, both the matching degrees and the associated label information are included in the second label information set. Types of the attribute type features in the RNN model may be the same as or different from types of the attribute type features in the convolutional neural network model. Using the facial expression as an example for description, there are three types of attribute type features in the RNN model: a "sadness" attribute type feature, a "surprise" attribute type feature, and a "happiness" attribute type feature. There are two types of attribute type features in the convolutional neural network model: a "sadness" attribute type feature and a "surprise" attribute type feature. The obtained first label information set and the obtained second label information set are fused, and label information corresponding to a highest matching degree after the fusion is the attribute type corresponding to the target object in the target video.

Optionally, the dynamic timing feature information of the key point video frame sequence and the static structural feature information of the target video frame image are fused, to obtain fused feature information. Matching degrees between the fused feature information and the plurality of attribute type features in the RNN model are recognized by using the classifier in the RNN model, and the plurality of matching degrees are associated with the label information corresponding to the plurality of attribute type features, to obtain the first label information set. That is, both the matching degrees and the associated label information are included in the first label information set. Matching degrees between the fused feature information and the plurality of attribute type features in the convolutional neural network model are recognized by using a classifier in the convolutional neural network model, and the plurality of matching degrees are associated with the label information corresponding to the plurality of attribute type features, to obtain the second label information set. Similarly, both the matching degrees and the associated label information are included in the second label information set. Similarly, types of the attribute type features in the RNN model may be the same as or different from types of the attribute type features in the convolutional neural network model. The obtained first label information set and the obtained second label information set are fused, and label information corresponding to a highest matching degree after the fusion is the attribute type corresponding to the target object in the target video.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

Figure 4:
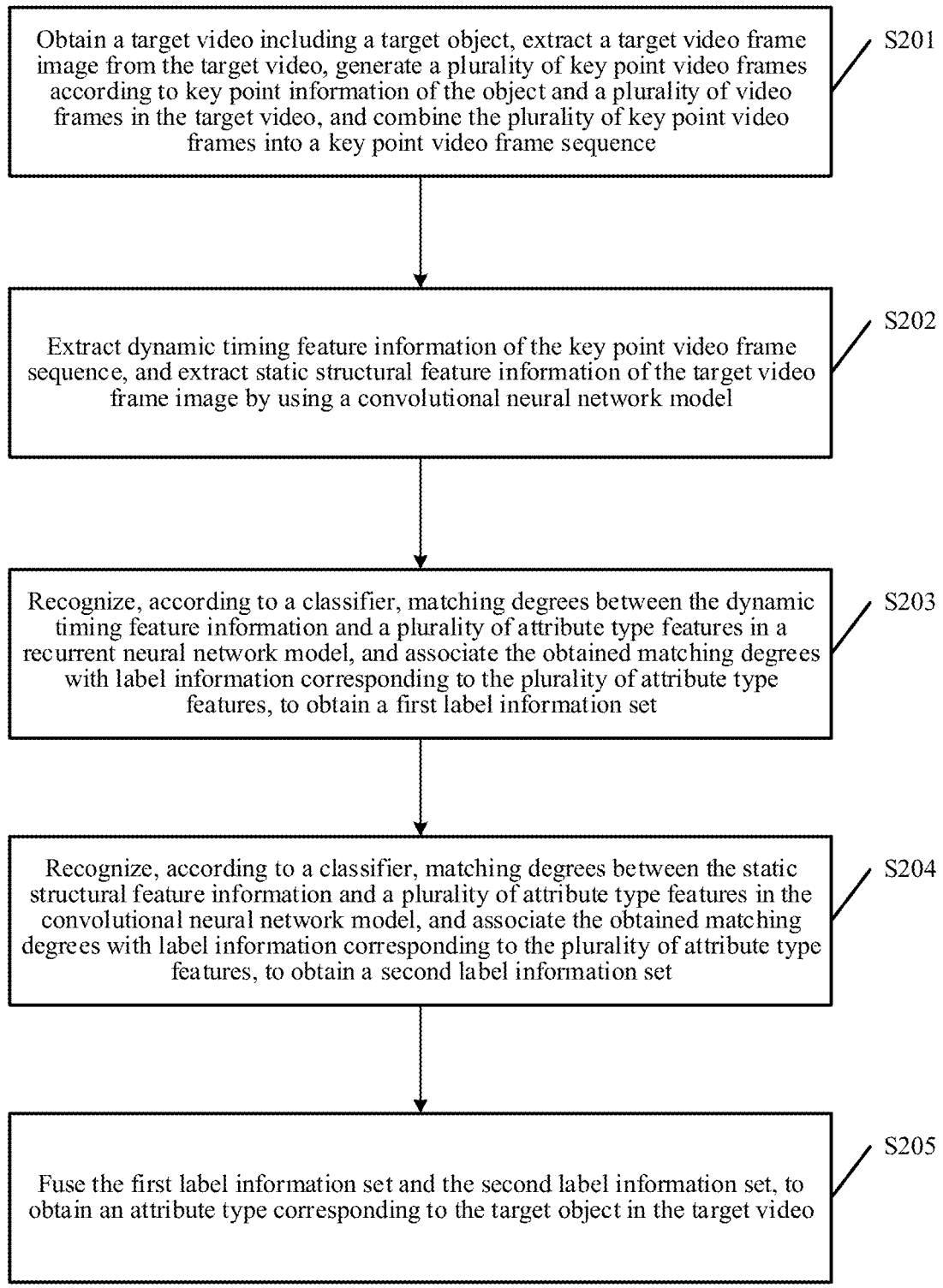
FIG. 4 is a schematic flowchart of another image recognition method according to an embodiment of the present disclosure.

In addition, FIG. 4 is a schematic flowchart of another image recognition method according to an embodiment of the present disclosure. As shown in FIG. 4, the image recognition method may include:

Step S201: Obtain a target video including a target object; extract a target video frame image from the target video; generate a plurality of key point video frames according to key point information of the object and a plurality of video frames in the target video, and combine the plurality of key point video frames into a key point video frame sequence.

Step S202: Extract dynamic timing feature information of the key point video frame sequence; and extract static structural feature information of the target video frame image by using a convolutional neural network model.

For specific implementations of steps S201 to S202, refer to steps S101 to S102 in the foregoing embodiment corresponding to FIG. 3, and details are not described herein again.

Step S203: Recognize, according to a classifier in an RNN model, matching degrees between the dynamic timing feature information of the key point video frame sequence and a plurality of attribute type features in the RNN model, and associate the matching degrees obtained through the dynamic timing feature information of the key point video frame sequence with label information corresponding to the plurality of attribute type features in the RNN model, to obtain a first label information set.

Specifically, after the dynamic timing feature information of the key point video frame sequence is obtained, the matching degrees between the dynamic timing feature information of the key point video frame sequence and the plurality of attribute type features in the RNN model are recognized according to the classifier in the RNN model. The classifier is pre-trained. An input of the classifier is the dynamic timing feature information. An output of the classifier is the matching degrees between the dynamic timing feature information and the plurality of attribute type features. A higher matching degree indicates a greater probability that the target object in the key point video frame sequence matches an attribute type corresponding to the attribute type feature. A quantity and types of the attribute type features included in the RNN model depend on a quantity and types of attribute types included in a training data set when the RNN model is trained. The matching degrees between the dynamic timing feature information and the plurality of attribute type features may be calculated by using a formula (3):

$$P(c \mid w_i) = \frac{e^{a_c(w_i)}}{\sum_{l=0}^{c-1} e^{a_l(w_i)}} \qquad (3)$$

$w_i$ represents a weight of each attribute type feature, $a_c(w_i)$ represents a sum of weights of all the attribute type features, and/represents an attribute type feature.

The obtained matching degrees between the dynamic timing feature information and the plurality of attribute type features are associated with label information corresponding to the plurality of attribute type features, to obtain a first label information set. For example, an attribute type related to a facial expression is recognized. There is a "happiness" attribute type feature, a "sadness" attribute type feature, and a "fear" attribute type feature in the RNN model. According to the classifier, it is recognized that a matching degree between dynamic timing feature information A and the "happiness" attribute type feature is 0.2; a matching degree between the dynamic timing feature information A and the "sadness" attribute type feature is 0.1, and a matching degree between the dynamic timing feature information A and the "fear" attribute type feature is 0.7. Then, the matching degrees are associated with corresponding label information, to obtain a first label information set: 0.2-happiness, 0.1-sadness, and 0.7-fear.

Step S204: Recognize, according to a classifier in the convolutional neural network model, matching degrees between the static structural feature information of the target video frame image and a plurality of attribute type features in the convolutional neural network model, and associate the matching degrees obtained through the static structural feature information of the target video frame image with label information corresponding to the plurality of attribute type features in the convolutional neural network model, to obtain a second label information set.

Specifically, after the static structural feature information of the target video frame image is obtained, the matching degrees between the static structural feature information of the target video frame image and the plurality of attribute type features in the convolutional neural network model are recognized according to the classifier in the convolutional neural network model. The classifier is also pre-trained. An input of the classifier is the static structural feature information. An output of the classifier is the matching degrees between the static structural feature information and the plurality of attribute type features. A higher matching degree indicates a greater probability that the target object in the target video frame image matches an attribute type corresponding to the attribute type feature. A quantity and types of the attribute type features included in the convolutional neural network model depend on a quantity and types of attribute types included in a training data set when the convolutional neural network model is trained. The matching degrees between the dynamic timing feature information and the plurality of attribute type features may be calculated by using a formula (4):

$$P_i = \frac{e^{y_i}}{\sum_{j=1}^{n} e^{y_i}} \qquad (4)$$

$$y_i = \sum_{i=1}^{m} x_i \cdot w_{i,j} + b_j$$

m represents a quantity of neurons in a fully connected layer in the convolutional neural network model, and $x_i$, $b_i$ and $w_{i,j}$ respectively represent the static structural feature information, a bias between two layers, and a weight between the two layers.

The obtained matching degrees between the dynamic timing feature information and the plurality of attribute type features are associated with label information corresponding to the plurality of attribute type features, to obtain a second label information set. For example, an attribute type related to a gesture is recognized. There is an "appreciation" attribute type feature, an "invitation" attribute type feature, and an "approval" attribute type feature in the convolutional neural network model. According to the classifier, it is recognized that a matching degree between static structural feature information B and the "appreciation" attribute type feature is 0.1; a matching degree between the static structural feature information B and the "invitation" attribute type feature is 0.3, and a matching degree between the static structural feature information B and the "approval" attribute type feature is 0.6. Then, the matching degrees are associated with corresponding label information, to obtain a second label information set: 0.1-appreciation, 0.3-invitation, and 0.6-approval. The label information corresponding to the plurality of attribute type features in the RNN model may be the same as or different from the label information corresponding to the plurality of attribute type features in the convolutional neural network.

Step S205: Fuse the first label information set and the second label information set, to obtain the attribute type corresponding to the target object in the target video.

Specifically, weighted averaging is performed on the matching degrees associated with the same label information in the first label information set and the second label information set, and the matching degrees on which the weighted averaging has been performed are associated with the label information. An obtained label information set is referred to as a target label information set. Matching degrees corresponding to pieces of label information without overlap with each other in the foregoing two sets (the first label information set and the second label information set) may be filtered, that is, the weighted averaging operation does not need to be performed on the matching degrees corresponding to the pieces of label information without overlap with each other. Label information associated with a maximum matching degree is extracted from the target label information set. The label information is the attribute type corresponding to the target object in the target video. For example, the first label information set is: 0.2-walking, 0.1-running, and 0.7-jogging. The second label information set is: 0.3-crawling, 0.1-running, and 0.6-jogging. The weighted averaging is performed on the matching degrees associated with the same label information, to obtain the target label information set: (0.1+0.1)/2=0.1-run, and (0.7+0.6)/2=0.65-jogging. "0.2-walking" in the first label information set and "0.3-crawling" in the second label information set are filtered. Therefore, the attribute type "jogging" is the attribute type corresponding to the target object in the target video.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

Figure 5:
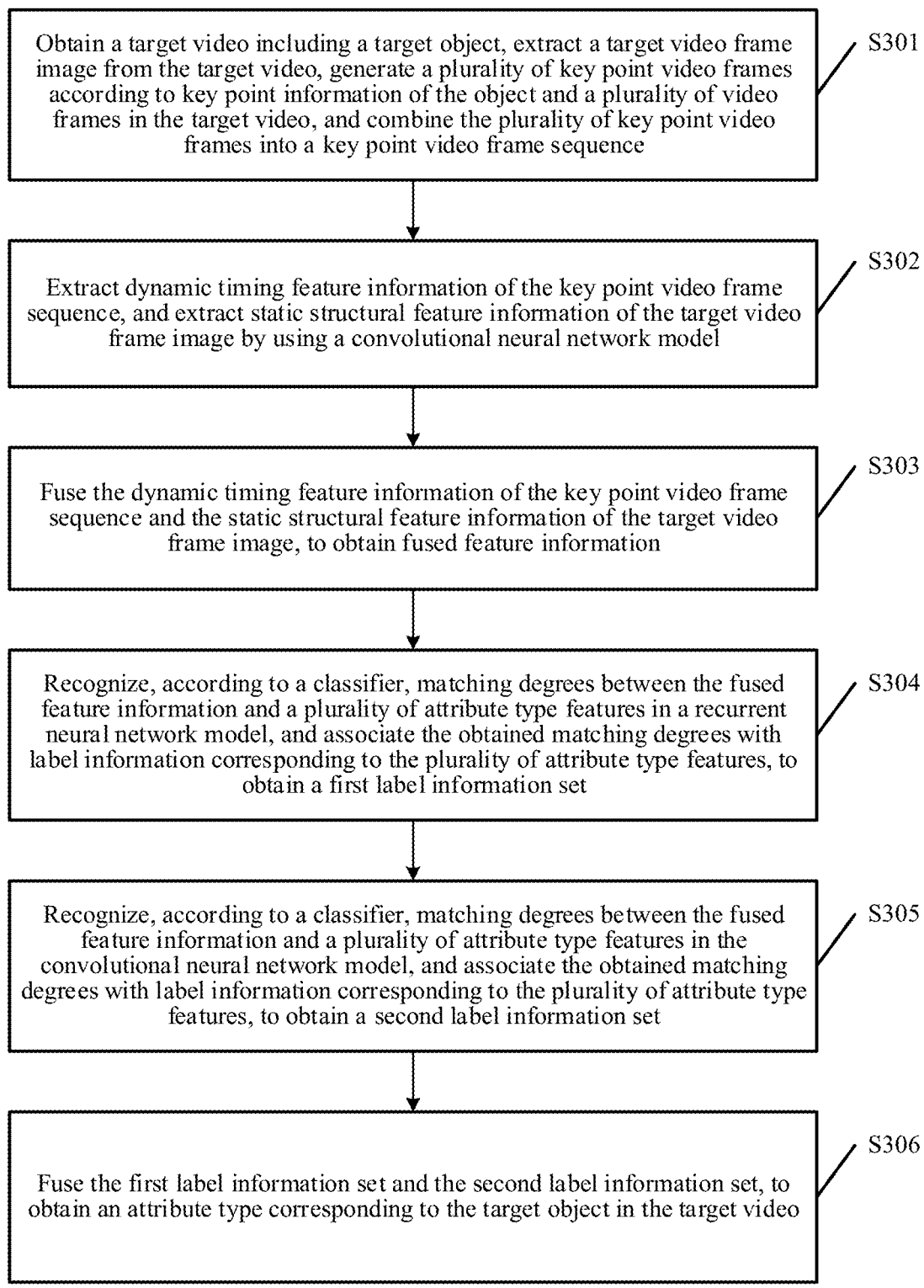
FIG. 5 is a schematic flowchart of another image recognition method according to an embodiment of the present disclosure.

In addition, FIG. 5 is a schematic flowchart of another image recognition method according to an embodiment of the present disclosure. As shown in FIG. 4, the image recognition method may include:

Step S301: Obtain a target video including a target object; extract a target video frame image from the target video; generate a plurality of key point video frames according to key point information of the object and a plurality of video frames in the target video, and combine the plurality of key point video frames into a key point video frame sequence.

Step S302: Extract dynamic timing feature information of the key point video frame sequence; and extract static structural feature information of the target video frame image by using a convolutional neural network model.

For specific implementations of steps S301 to S302, refer to steps S101 to S102 in the foregoing embodiment corresponding to FIG. 3, and details are not described herein again.

Step S303: Fuse the dynamic timing feature information of the key point video frame sequence and the static structural feature information of the target video frame image, to obtain fused feature information.

Specifically, the dynamic timing feature information of the key point video frame sequence and the static structural feature information of the target video frame image are fused, to obtain spatial-temporal feature information of the target object in the target video. The spatial-temporal feature information is referred to as fused feature information. A procedure of fusing the feature information may be: first, normalizing the dynamic timing feature information and the static structural feature information into a same range, and directly connecting the two types of feature information as the fused feature information, or after normalizing the dynamic timing feature information and the static structural feature information into the same range, reducing a dimensionality of feature information having a higher dimensionality in the two types of feature information by using principal component analysis (PCA), to make the two types of feature information have a same dimensionality, or increasing a dimensionality of feature information having a lower dimensionality in the two types of feature information by using a support vector machine (SVM), to make the two types of feature information have a same dimensionality, and then, performing unified modeling processing on the two types of feature information having the same dimensionality by using a Gaussian model or a Gaussian mixed model, where feature information obtained after the processing is the fused feature information.

Step S304: Recognize, according to a classifier in an RNN model, matching degrees between the fused feature information and a plurality of attribute type features in the RNN model, and associate the matching degrees obtained through the RNN model with label information corresponding to the plurality of attribute type features in the RNN model, to obtain a first label information set.

Specifically, after the fused feature information is obtained, the matching degrees between the fused feature information and the plurality of attribute type features in the RNN model are obtained according to the classifier in the RNN model. The classifier is pre-trained. An input of the classifier is the fused feature information. An output of the classifier is the matching degrees between the fused feature information and the plurality of attribute type features. A higher matching degree indicates a greater probability that the fused feature information matches an attribute type corresponding to the attribute type feature. A quantity and types of the attribute type features included in the RNN model depend on a quantity and types of attribute types included in a training data set when the RNN model is trained. The obtained matching degrees between the dynamic timing feature information and the plurality of attribute type features are associated with label information corresponding to the plurality of attribute type features, to obtain a first label information set. The attribute type feature of the label information corresponds to an attribute type. For example, the label information may be an attribute type related to a facial expression such as sadness, fear, or scare, or may be an attribute type related to an action such as running, speed walking, or walking, or may be an attribute type related to a gesture such as appreciation, invitation, or rejection.

Step S305: Recognize, according to a classifier in the convolutional neural network model, matching degrees between the fused feature information and a plurality of attribute type features in the convolutional neural network model, and associate the matching degrees obtained through the convolutional neural network model with label information corresponding to the plurality of attribute type features in the convolutional neural network model, to obtain a second label information set.

Specifically, after the fused feature information is obtained, the matching degrees between the fused feature information and the plurality of attribute type features in the convolutional neural network model are recognized according to the classifier in the convolutional neural network model. The classifier is pre-trained. An input of the classifier is the fused feature information. An output of the classifier is the matching degrees between the fused feature information and the plurality of attribute type features. A higher matching degree indicates a greater probability that the fused feature information matches an attribute type corresponding to the attribute type feature. A quantity and types of the attribute type features included in the convolutional neural network model depend on attribute types included in a training data set when the convolutional neural network model is trained. The obtained matching degrees between the dynamic timing feature information and the plurality of attribute type features are associated with label information corresponding to the plurality of attribute type features, to obtain a second label information set. The label information corresponding to the plurality of attribute type features in the RNN model may be the same as or different from the label information corresponding to the plurality of attribute type features in the convolutional neural network. Because the first label information set and the second label information set are obtained through two different classifiers, a chronological sequence of obtaining the first label information set and the second label information set is not limited.

Step S306: Fuse the first label information set and the second label information set, to obtain the attribute type corresponding to the target object in the target video.

For a specific implementation of step S306, refer to step S205 in the foregoing embodiment corresponding to FIG. 4, and details are not described herein again.

Figure 6:
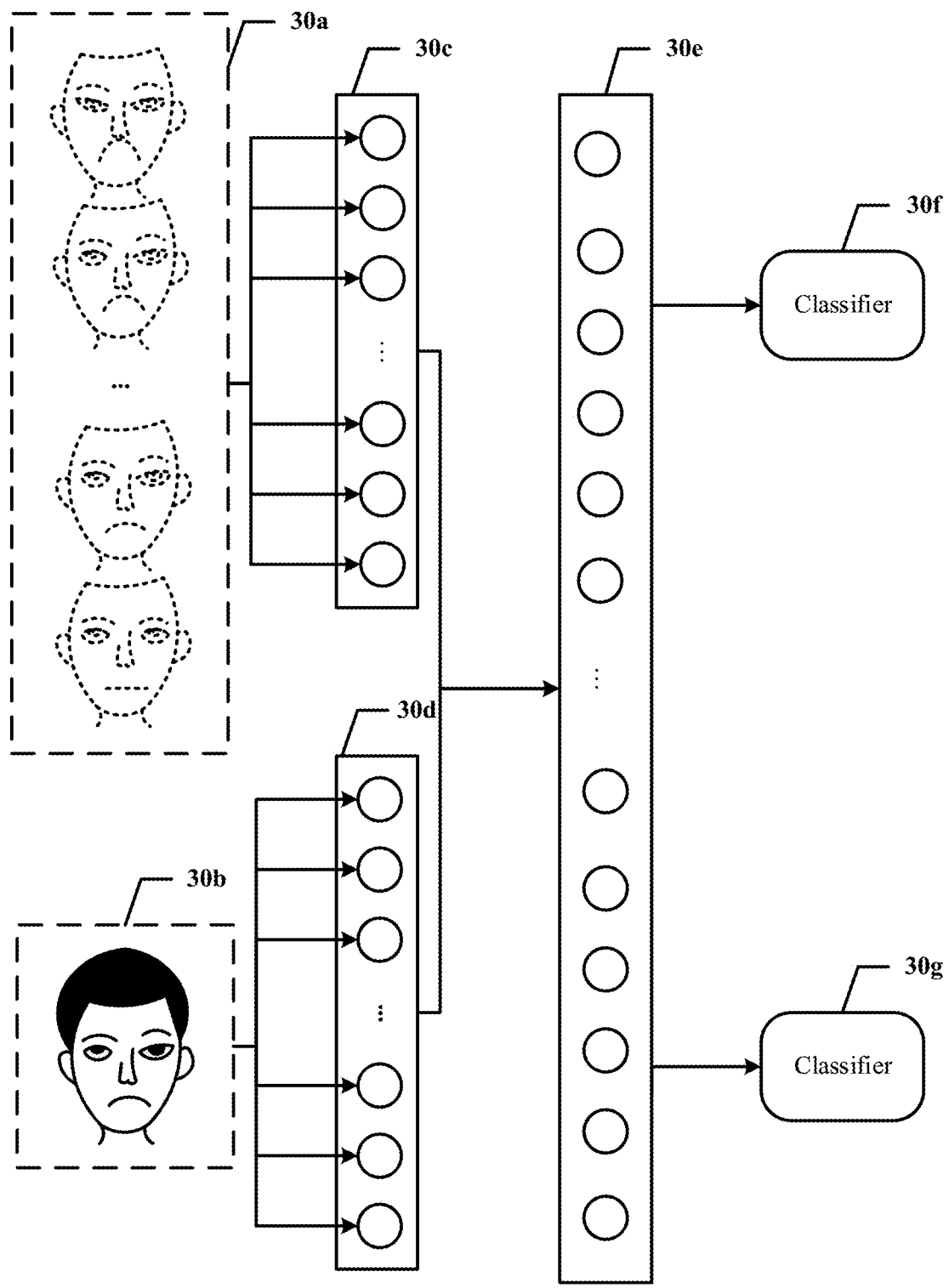
FIG. 6 is a schematic diagram of recognizing an attribute type of a target object according to an embodiment of the present disclosure.

FIG. 6 is a schematic diagram of recognizing an attribute type of a target object according to an embodiment of the present disclosure. As shown in FIG. 6, a key point video frame sequence 30*a* and a target image 30*b* are extracted from the target video. The fully connected layer in the RNN model outputs dynamic timing feature information of the key point video frame sequence 30*a*, and the dynamic timing feature information is mapped to a neuron set 30*c* including 200 neurons. The fully connected layer in the convolutional neural network model outputs static structural feature information of the target image 30*b*. The static structural feature information is mapped to a neuron set 30*d* including 150 neurons. The dynamic timing feature information and the static structural feature information are fused, that is, the neuron set 30*c* and the neuron set 30*d* are fused, to obtain a neuron set 30*e* including 350 neurons. The neurons in the neuron set 30*e* are inputted to a classifier 30*f* in the RNN model, to obtain a first label information set: 0.1-happiness, 0.2-anger, and 0.7-sadness. The neurons in the neuron set 30*e* are inputted to a classifier 30*g* in the convolutional neural network model, to obtain a second label information set: 0.2-happiness, 0.2-anger, and 0.6-sadness. Weighted averaging is further performed on matching degrees corresponding to the same label information in the first label information set (0.1-happiness, 0.2-anger, and 0.7-sadness) and the second label information set (0.2-happiness, 0.2-anger, and 0.6-sadness), to obtain a target label information set: 0.15-happiness, 0.2-anger, and 0.65-sadness. Therefore, the attribute type of the target object in the target video is: the "sadness" attribute type.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

Figure 7:
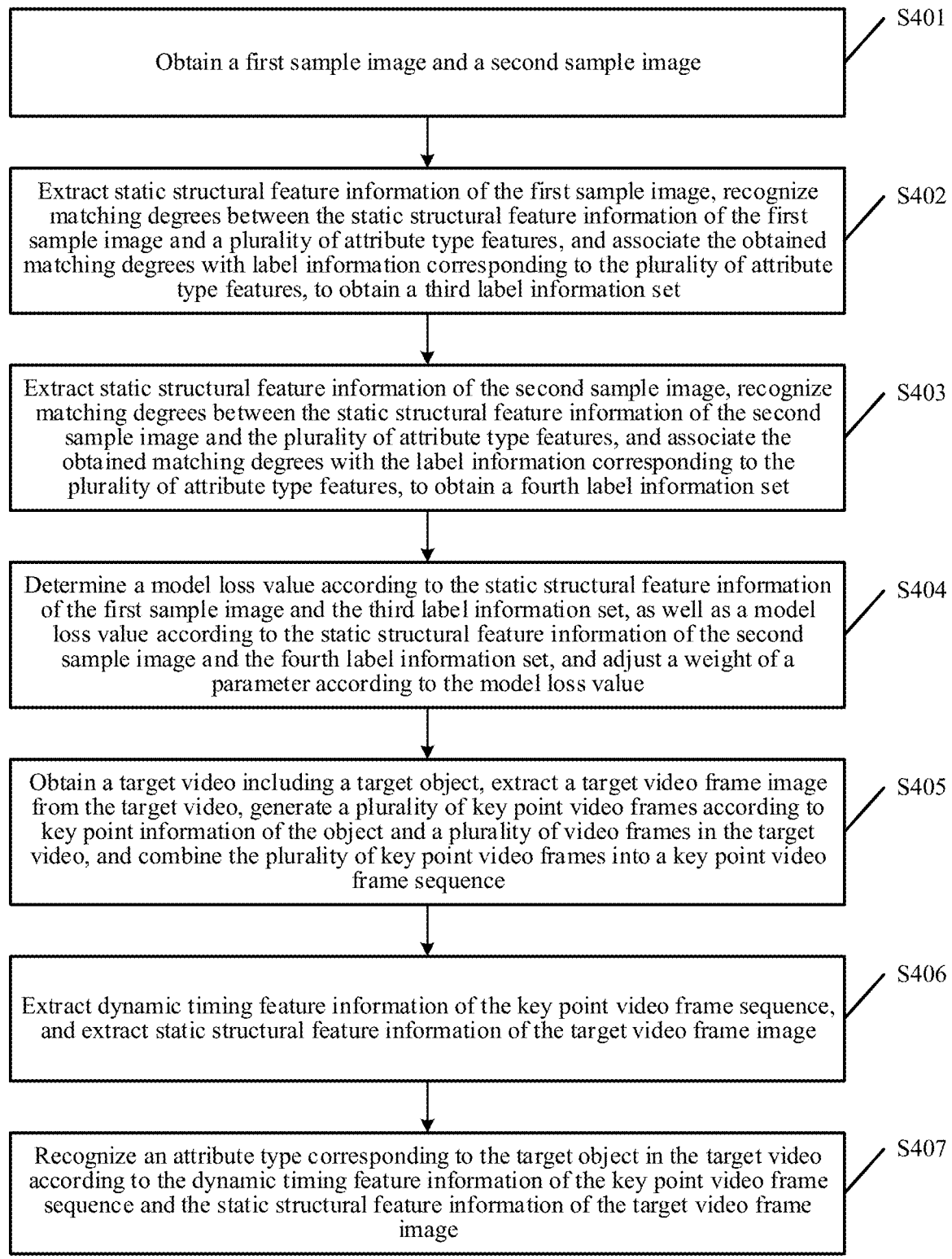
FIG. 7 is a schematic flowchart of another image recognition method according to an embodiment of the present disclosure.

In addition, FIG. 7 is a schematic flowchart of another image recognition method according to an embodiment of the present disclosure. As shown in FIG. 7, the image recognition method may include:

Step S401: Obtain a first sample image and a second sample image.

Specifically, two images are respectively obtained as the first sample image and the second sample image. A sample attribute type of the first sample image may be the same as or different from a sample attribute type of the second sample image. For example, the sample attribute type of the first sample image is: disgust, and the sample attribute type of the second sample image may be disgust, or may be another attribute type such as anxiety or anger. The sample attribute type is an actual attribute type of an object in a sample image.

Step S402: Extract static structural feature information of the first sample image, recognize, according to a classifier in the convolutional neural network model, matching degrees between the static structural feature information of the first sample image and a plurality of attribute type features in the convolutional neural network model, and associate the matching degrees obtained through the static structural feature information of the first sample image with label information corresponding to the plurality of attribute type features in the convolutional neural network model, to obtain a third label information set.

Specifically, through the convolution processing and the pooling processing, the static structural feature information of the first sample image may be extracted. For a specific procedure of extracting static structural feature information of an image through the convolution processing and the pooling processing, refer to the descriptions of step S102 in the foregoing embodiment corresponding to FIG. 3. After the static structural feature information of the first sample image is obtained, matching degrees between the static structural feature information of the first sample image and the plurality of attribute type features in the convolutional neural network model are recognized according to the classifier in the convolutional neural network model. A higher matching degree indicates a greater probability that the static structural feature information of the first sample image matches the attribute type features included in the convolutional neural network model. The obtained matching degrees between the dynamic timing feature information and the plurality of attribute type features are associated with label information corresponding to the plurality of attribute type features, to obtain a third label information set.

Step S403: Extract static structural feature information of the second sample image, recognize, according to the classifier in the convolutional neural network model, matching degrees between the static structural feature information of the second sample image and the plurality of attribute type features, and associate the matching degrees obtained through the static structural feature information of the second sample image with the label information corresponding to the plurality of attribute type features in the convolutional neural network model, to obtain a fourth label information set.

Specifically, through the convolution processing and the pooling processing, the static structural feature information of the second sample image may be extracted. After the static structural feature information of the second sample image is obtained, matching degrees between the static structural feature information of the second sample image and the plurality of attribute type features in the convolutional neural network model are recognized according to the classifier in the convolutional neural network model. A higher matching degree indicates a greater probability that the static structural feature information of the second sample image matches the attribute type features included in the convolutional neural network model. A quantity and types of the attribute type features are set when the convolutional neural network model is trained. The obtained matching degrees between the dynamic timing feature information and the plurality of attribute type features are associated with label information corresponding to the plurality of attribute type features, to obtain a fourth label information set.

Step S404: Determine a model loss value according to the static structural feature information of the first sample image and the third label information set, as well as the static structural feature information of the second sample image and the fourth label information set, and adjust a weight of a parameter in the convolutional neural network model according to the model loss value.

Specifically, a recognition loss value of the first sample image (the recognition loss value of the first sample image may be represented by Reloss_1) is generated according to the third label information set and a sample attribute type corresponding to the first sample image. The recognition loss value may be calculated according to a formula (5):

$$\text{Reloss}(p, q) = -\sum_{x} p(x) \log q(x) \quad (5)$$

x represents static structural feature information of an image (the first sample image or the second sample image), p(x) represents a sample attribute type of the image, and q(x) represents a plurality of matching degrees in the third label information set.

Similarly, a recognition loss value of the second sample image (the recognition loss value of the second sample image may be represented by Reloss_2) is generated according to the fourth label information set and a sample attribute type corresponding to the second sample image and by using the formula (5).

Whether the sample attribute type corresponding to the first sample image is the same as the sample attribute type corresponding to the second sample image is detected. If the sample attribute type corresponding to the first sample image is the same as the sample attribute type corresponding to the second sample image, the static structural feature information of the first sample image and the static structural feature information of the second sample image are substituted into a formula (6), to calculate a verification loss value (the verification loss value may be represented by Veloss):

$$\text{Veloss}(x_i, x_j, \theta_{ij}) = \frac{1}{2}\|f(x_i) - f(x_j)\|_2^2 \qquad (6)$$

In the formula (6), $x_i$ represents the first sample image, $x_j$ represents the second sample image, $f(x_i)$ represents the static structural feature information of the first sample image, and $f(x_j)$ represents the static structural feature information of the second sample image.

If the sample attribute type corresponding to the first sample image is different from the sample attribute type corresponding to the second sample image, the static structural feature information of the first sample image and the static structural feature information of the second sample image are substituted into a formula (7), to calculate a verification loss value:

$$\text{Veloss}(x_i, x_j, \theta_{ij}) = \frac{1}{2} \max(0, \delta - \|f(x_i) - f(x_j)\|_2^2) \qquad (7)$$

In the formula (7), $x_i$ represents the first sample image, $x_j$ represents the second sample image, $f(x_i)$ represents the static structural feature information of the first sample image, $f(x_j)$ represents the static structural feature information of the second sample image, and $\delta$ is a preset control variable. For example, the verification loss function is set in a way that, when two sample images have the same expression, their corresponding feature differences are small enough, and when the two sample images have different expression, their corresponding feature differences are large enough.

The recognition loss value (Reloss_1) of the first sample image, the recognition loss value (Reloss_2) of the second sample image, and the verification loss value (Veloss) are combined/determined as a model loss value (FiLoss). Weights of neurons in the convolutional layer, the pooling layer, and the fully connected layer in the convolutional neural network model are reversely adjusted according to the model loss values. An objective is to enlarge differences between features of different expressions as much as possible, while reducing differences between features of the same expression. Certainly, to balance the two types of losses (the recognition loss value and the verification loss value), a balancing factor may be set for each type of loss. The convolutional neural network model in which the weights have been adjusted may be configured to extract the static structural feature information of the image.

Figure 8:
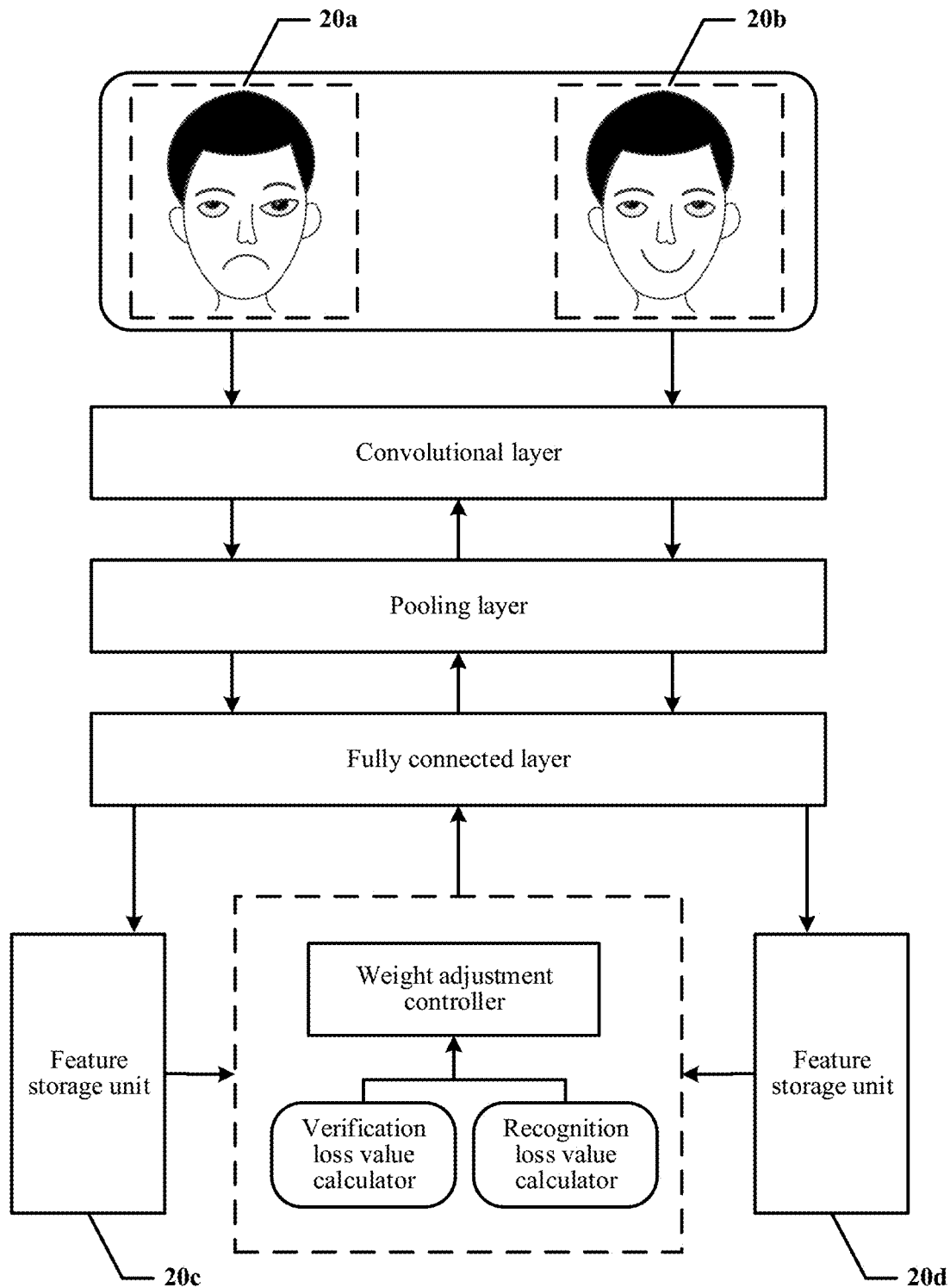
FIG. 8 is a schematic diagram of adjusting a convolutional neural network model according to an embodiment of the present disclosure.

FIG. 8 is a schematic diagram of adjusting a convolutional neural network model according to an embodiment of the present disclosure. An image 20a and an image 20b each include a facial expression. The image 20a is inputted into a convolutional neural network model, and static structural feature information of the image 20a is obtained through convolution processing of a plurality of convolutional layers, pooling processing of a plurality of pooling layers, and weight sharing of neurons in a fully connected layer. The static structural feature information of the image 20a is stored in a feature storage unit 20c. Similarly, the image 20b is inputted into the convolutional neural network model, and static structural feature information of the image 20b is obtained through the convolutional layers, the pooling layers, and the fully connected layer. The static structural feature information of the image 20b is stored in a feature storage unit 20d. A recognition loss value calculator calculates a recognition loss value of the image 20a according to the static structural feature information of the image 20a, and according to the static structural feature information and an actual attribute type (sadness) of and the facial expression in the image 20a. The recognition loss value calculator calculates a recognition loss value of the image 20b according to the static structural feature information of the image 20b, and according to the static structural feature information and an actual attribute type (happiness) of the facial expression in the image 20b. A verification loss value calculator calculates a verification loss value according to the static structural feature information of the image 20a and the static structural feature information of the image 20b. A weight controller reversely adjusts weights of the convolutional layers, the pooling layers, and the plurality of neurons in the fully connected layer in the convolutional neural network model according to the recognition loss value of the image 20a, the recognition loss value of the image 20b, and the verification loss value.

Step S405: Obtain a target video including a target object; extract a target video frame image from the target video, generate a plurality of key point video frames according to key point information of the object and a plurality of video frames in the target video, and combine the plurality of key point video frames into a key point video frame sequence.

Step S406: Extract dynamic timing feature information of the key point video frame sequence; and extract static structural feature information of the target video frame image.

Step S407: Recognize an attribute type corresponding to the target object in the target video according to the dynamic timing feature information of the key point video frame sequence and the static structural feature information of the target video frame image.

For specific implementations of steps S405 to S407, refer to steps S101 to S103 in the foregoing embodiment corresponding to FIG. 3, and details are not described herein again.

It is to be understood that although the steps in the flowchart are sequentially shown according to indication of an arrow, the steps are not necessarily sequentially performed according to a sequence indicated by the arrow. Unless explicitly specified in the present disclosure, execution of the steps is not strictly limited, and the steps may be performed in other sequences. Besides, at least some steps in the flowchart may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

Figure 9:
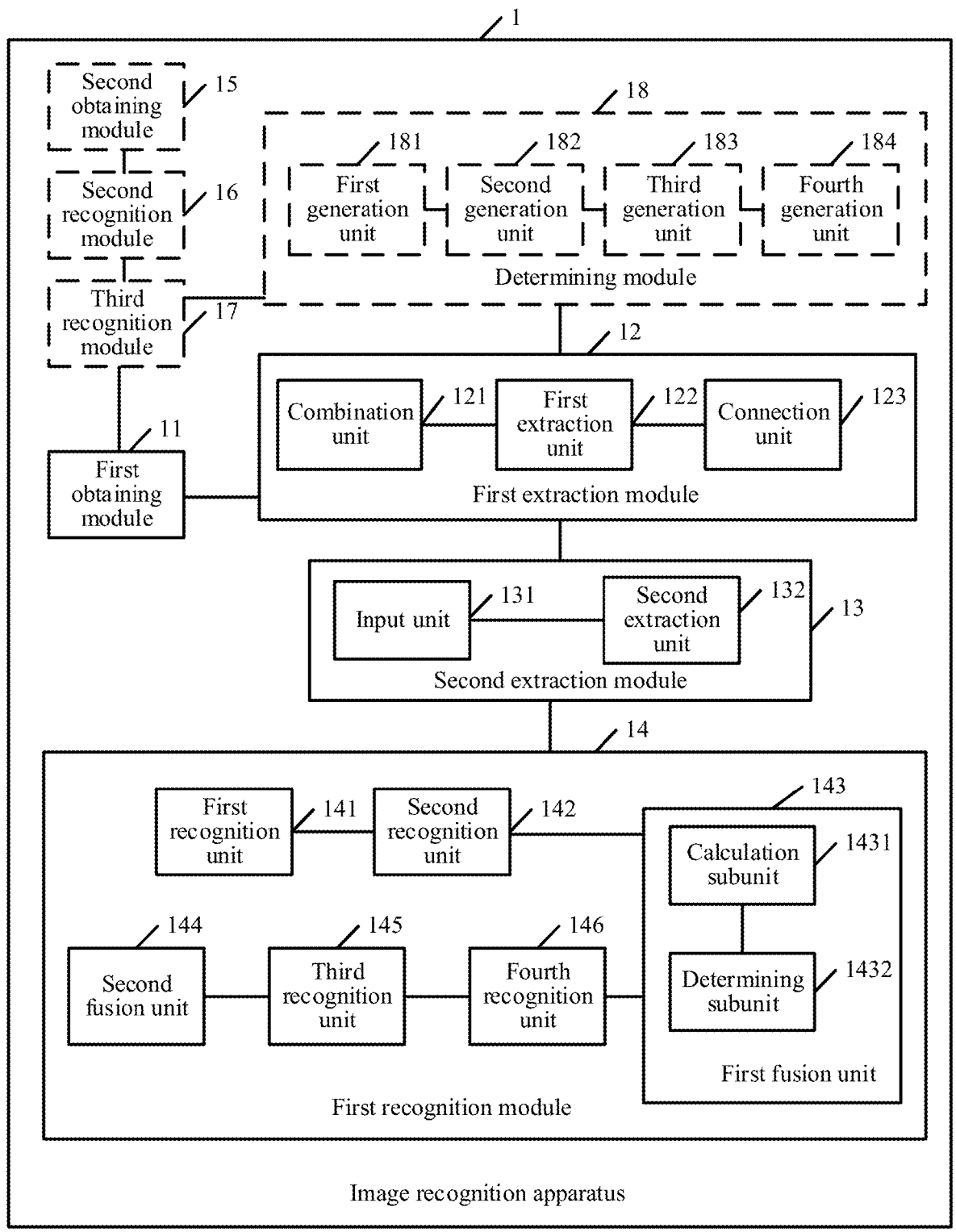
FIG. 9 is a schematic structural diagram of an image recognition apparatus according to an embodiment of the present disclosure.

In addition, FIG. 9 is a schematic structural diagram of an image recognition apparatus according to an embodiment of the present disclosure. As shown in FIG. 9, an image recognition apparatus 1 may include: a first obtaining module 11, a first extraction module 12, a second extraction module 13, and a first recognition module 14.

The first obtaining module 11 is configured to obtain a target video including a target object; extract a target video frame image from the target video; generate a plurality of key point video frames according to key point information of the object and a plurality of video frames in the target video, and combine the plurality of key point video frames into a key point video frame sequence.

The first extraction module 12 is configured to extract dynamic timing feature information of the key point video frame sequence.

The second extraction module 13 is configured to extract static structural feature information of the target video frame image.

The first recognition module 14 is configured to recognize an attribute type corresponding to the target object in the target video according to the dynamic timing feature information of the key point video frame sequence and the static structural feature information of the target video frame image.

For implementations of specific functions of the first obtaining module 11, the first extraction module 12, the second extraction module 13, and the first recognition module 14, refer to steps S101 to S103 in the foregoing embodiment corresponding to FIG. 3, and details are not described herein again.

Referring to FIG. 9, the first extraction module 12 may include: a combination unit 121, a first extraction unit 122, and a connection unit 123.

The combination unit 121 is configured to extract key marker areas from each key point video frame in the key point video frame sequence, and respectively combine same key marker areas in all the key point video frames into unit key point video frame sequences.

The first extraction unit 122 is configured to separately input the unit key point video frame sequences into an RNN model, to extract dynamic timing feature information of each unit key point video frame sequence.

The connection unit 123 is configured to connect the dynamic timing feature information of the unit key point video frame sequences according to location relationships between the unit key point video frame sequences and the corresponding key marker areas, to obtain the dynamic timing feature information of the key point video frame sequence.

For implementations of specific functions of the combination unit 121, the first extraction unit 122, and the connection unit 123, refer to step S102 in the foregoing embodiment corresponding to FIG. 3, and details are not described herein again.

Referring to FIG. 9, the second extraction module 13 may include: an input unit 131 and a second extraction unit 132.

The input unit 131 is configured to input the target video frame image into an input layer of the convolutional neural network model.

The second extraction unit 132 is configured to extract the static structural feature information of the target video frame image through convolution processing of a convolutional layer in the convolutional neural network model and pooling processing of a pooling layer in the convolutional neural network model.

For implementations of specific functions of the input unit 131 and the second extraction unit 132, refer to step S102 in the foregoing embodiment corresponding to FIG. 3, and details are not described herein again.

Referring to FIG. 9, the first recognition module 14 includes: a first recognition unit 141, a second recognition unit 142, a first fusion unit 143, a second fusion unit 144, a third recognition unit 145, and a fourth recognition unit 146.

The first recognition unit 141 is configured to recognize, according to a classifier in an RNN model, matching degrees between the dynamic timing feature information of the key point video frame sequence and a plurality of attribute type features in the RNN model, and associate the matching degrees obtained through the dynamic timing feature information of the key point video frame sequence with label information corresponding to the plurality of attribute type features in the RNN model, to obtain a first label information set.

The second recognition unit 142 is configured to recognize, according to a classifier in the convolutional neural network model, matching degrees between the static structural feature information of the target video frame image and a plurality of attribute type features in the convolutional neural network model, and associate the matching degrees obtained through the static structural feature information of the target video frame image with label information corresponding to the plurality of attribute type features in the convolutional neural network model, to obtain a second label information set.

The first fusion unit 143 is configured to fuse the first label information set and the second label information set, to obtain the attribute type corresponding to the target object in the target video.

The second fusion unit 144 is configured to fuse the dynamic timing feature information of the key point video frame sequence and the static structural feature information of the target video frame image, to obtain fused feature information.

The third recognition unit 145 is configured to recognize, according to a classifier in a RNN model, matching degrees between the fused feature information and a plurality of attribute type features in the RNN model, and associate the matching degrees obtained through the RNN model with label information corresponding to the plurality of attribute type features in the RNN model, to obtain a first label information set.

The fourth recognition unit 146 is configured to recognize, according to a classifier in the convolutional neural network model, matching degrees between the fused feature information and a plurality of attribute type features in the convolutional neural network model, and associate the matching degrees obtained through the convolutional neural network model with label information corresponding to the plurality of attribute type features in the convolutional neural network model, to obtain a second label information set.

For implementations of specific functions of the first recognition unit 141, the second recognition unit 142, and the first fusion unit 143, refer to steps S203 to S205 in the foregoing embodiment corresponding to FIG. 4, for implementations of specific functions of the second fusion unit 144, the third recognition unit 145, and the fourth recognition unit 146, refer to steps S303 to S305 in the foregoing embodiment corresponding to FIG. 4, and details are not described herein again. When the first recognition unit 141 and the second recognition unit 142 perform corresponding operations, the second fusion unit 144, the third recognition unit 145, and the fourth recognition unit 146 may stop performing operations. Similarly, when the second fusion unit 144, the third recognition unit 145, and the fourth recognition unit 146 perform corresponding operations, the first recognition unit 141 and the second recognition unit 142 may stop performing operations.

Referring to FIG. 9, the first fusion unit 143 may include a calculation subunit 1431 and a determining subunit 1432.

The calculation subunit 1431 is configured to perform weighted averaging on the matching degrees associated with the same label information in the first label information set and the second label information set, and associate the matching degrees on which the weighted averaging has been performed with the label information, to obtain a target label information set.

The determining subunit 1432 is configured to extract label information associated with a maximum matching degree from the target label information set, and use the extracted label information as the attribute type corresponding to the target object in the target video.

For implementations of specific functions of the calculation subunit 1431 and the determining subunit 1432, refer to step S205 in the foregoing embodiment corresponding to FIG. 4, and details are not described herein again.

As shown in FIG. 9, the image recognition apparatus 1 may include: a first obtaining module 11, a first extraction module 12, a second extraction module 13, and a first recognition module 14. The image recognition apparatus 1 may further include a second obtaining module 15, a second recognition module 16, a third recognition module 17, and a determining module 18.

The second obtaining module 15 is configured to obtain a first sample image and a second sample image.

The second recognition module 16 is configured to extract static structural feature information of the first sample image, recognize, according to a classifier in the convolutional neural network model, matching degrees between the static structural feature information of the first sample image and a plurality of attribute type features in the convolutional neural network model, and associate the matching degrees obtained through the static structural feature information of the first sample image with label information corresponding to the plurality of attribute type features in the convolutional neural network model, to obtain a third label information set.

The third recognition module 17 is configured to extract static structural feature information of the second sample image, recognize, according to the classifier in the convolutional neural network model, matching degrees between the static structural feature information of the second sample image and the plurality of attribute type features, and associate the matching degrees obtained through the static structural feature information of the second sample image with the label information corresponding to the plurality of attribute type features in the convolutional neural network model, to obtain a fourth label information set.

The determining module 18 is configured to determine a model loss value according to the static structural feature information of the first sample image and the third label information set, as well as the static structural feature information of the second sample image and the fourth label information set, and adjust a weight of a parameter in the convolutional neural network model according to the model loss value.

For implementations of specific functions of the second obtaining module 15, the second recognition module 16, the third recognition module 17, and the determining module 18, refer to steps S401 to S404 in the foregoing embodiment corresponding to FIG. 7, and details are not described herein again.

As shown in FIG. 9, the determining module 18 includes: a first generation unit 181, a second generation unit 182, a third generation unit 183, and a fourth generation unit 184.

The first generation unit 181 is configured to generate a recognition loss value of the first sample image according to the third label information set and a sample attribute type corresponding to the first sample image.

The second generation unit 182 is configured to generate a recognition loss value of the second sample image according to the fourth label information set and a sample attribute type corresponding to the second sample image.

The third generation unit 183 is configured to generate the verification loss value according to the static structural feature information of the first sample image, the sample attribute type corresponding to the first sample image, the static structural feature information of the second sample image, and the sample attribute type corresponding to the second sample image.

The fourth generation unit 184 is configured to generate the model loss value according to the recognition loss value of the first sample image, the recognition loss value of the second sample image, and the verification loss value.

For implementations of specific functions of the first generation unit 181, the second generation unit 182, the third generation unit 183, and the fourth generation unit 184, refer to step S404 in the foregoing embodiment corresponding to FIG. 7, and details are not described herein again.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

Figure 10:
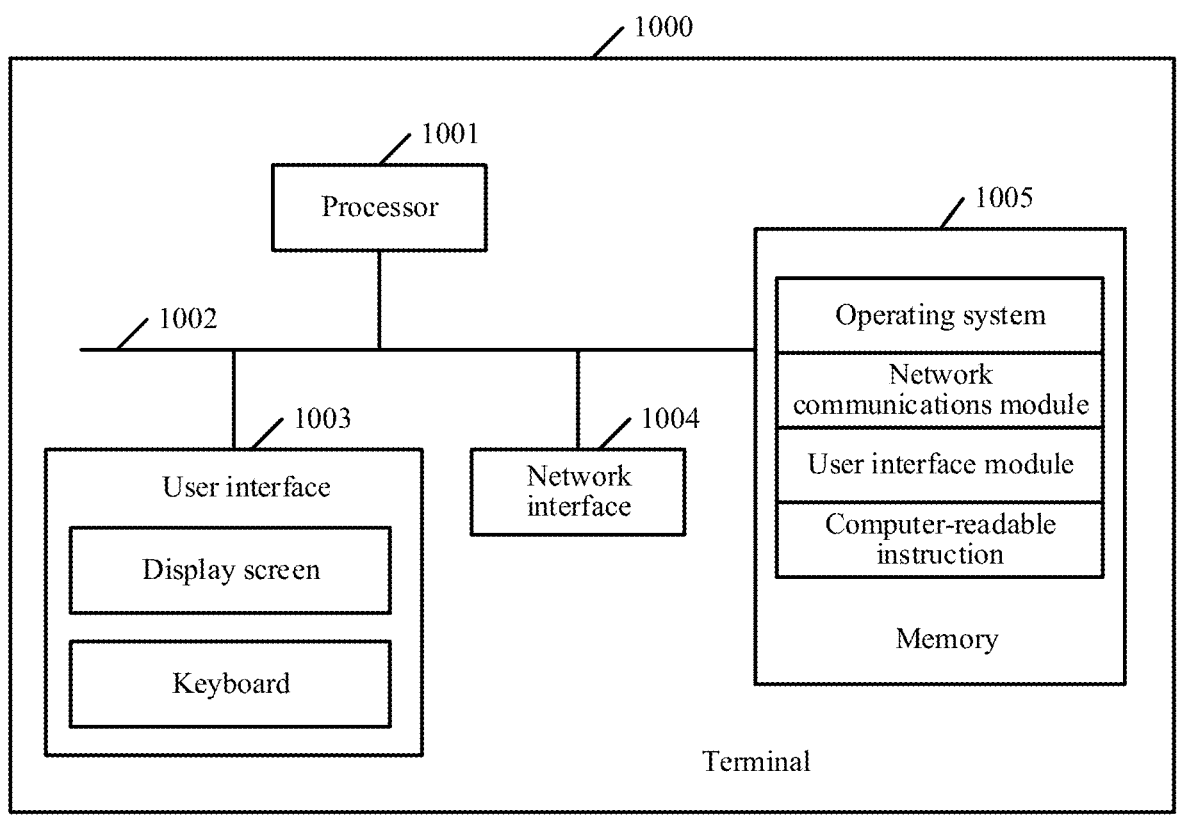
FIG. 10 is a schematic structural diagram of a terminal according to an embodiment of the present disclosure.

Further, FIG. 10 is a schematic structural diagram of a terminal according to an embodiment of the present disclosure. As shown in FIG. 10, the image recognition apparatus 1 in FIG. 9 may be applied to a terminal 1000. The terminal 1000 may include: a processor 1001, a network interface 1004, and a memory 1005. In addition, the terminal 1000 may further include: a user interface 1003, and at least one communications bus 1002. The communications bus 1002 is configured to implement connection and communication between the components. The user interface 1003 may include a display, a keyboard, and optionally, the user interface 1003 may further include a standard wired interface and a standard wireless interface. Optionally, the network interface 1004 may include a standard wired interface and a standard wireless interface (such as a Wi-Fi interface). The memory 1004 may be a high-speed RAM memory, or may be a non-volatile memory, for example, at least one magnetic disk memory. Optionally, the memory 1004 may be at least one storage apparatus that is located far away from the foregoing processor 1001. As shown in FIG. 10, the memory 1004, used as a computer-readable storage medium, may include an operating system, a network communications module, a user interface module, and a computer-readable instruction.

In the terminal 1000 shown in FIG. 10, the network interface 1004 may provide a network communication function. The user interface 1003 is mainly configured to provide an input interface for a user. The processor 1001 may be configured to invoke the computer-readable instruction stored in the memory 1004, to implement:

obtaining a target video including a target object; extracting a target video frame image from the target video, generating a plurality of key point video frames according to key point information of the object and a plurality of video frames in the target video, and combining the plurality of key point video frames into a key point video frame sequence;

extracting dynamic timing feature information of the key point video frame sequence; and extracting static structural feature information of the target video frame image; and recognizing an attribute type corresponding to the target object in the target video according to the dynamic timing feature information of the key point video frame sequence and the static structural feature information of the target video frame image.

In an embodiment, when performing the extracting dynamic timing feature information of the key point video frame sequence, the processor 1001 specifically performs the following steps:

extracting key marker areas from each key point video frame in the key point video frame sequence, and respectively combining same key marker areas in all the key point video frames into unit key point video frame sequences;

respectively inputting the unit key point video frame sequences into an RNN model, to extract dynamic timing feature information of each unit key point video frame sequence; and connecting the dynamic timing feature information of the unit key point video frame sequences according to location relationships between the unit key point video frame sequences and the corresponding key marker areas, to obtain the dynamic timing feature information of the key point video frame sequence.

In an embodiment, when performing the extracting static structural feature information of the target video frame image, the processor 1001 specifically performs the following steps:

inputting the target video frame image into an input layer of the convolutional neural network model; and extracting the static structural feature information of the target video frame image through convolution processing of a convolutional layer in the convolutional neural network model and pooling processing of a pooling layer in the convolutional neural network model.

In an embodiment, when performing the recognizing an attribute type corresponding to the target object in the target video according to the dynamic timing feature information of the key point video frame sequence and the static structural feature information of the target video frame image, the processor 1001 specifically performs the following steps:

recognizing, according to a classifier in a recurrent neural network model, matching degrees between the dynamic timing feature information of the key point video frame sequence and a plurality of attribute type features in the recurrent neural network model, and associating the matching degrees obtained through the dynamic timing feature information of the key point video frame sequence with label information corresponding to the plurality of attribute type features in the recurrent neural network model, to obtain a first label information set;

recognizing, according to a classifier in the convolutional neural network model, matching degrees between the static structural feature information of the target video frame image and a plurality of attribute type features in the convolutional neural network model, and associating the matching degrees obtained through the static structural feature information of the target video frame image with label information corresponding to the plurality of attribute type features in the convolutional neural network model, to obtain a second label information set; and fusing the first label information set and the second label information set, to obtain the attribute type corresponding to the target object in the target video.

In an embodiment, when performing the recognizing an attribute type corresponding to the target object in the target video according to the dynamic timing feature information of the key point video frame sequence and the static structural feature information of the target video frame image, the processor 1001 specifically performs the following steps:

fusing the dynamic timing feature information of the key point video frame sequence and the static structural feature information of the target video frame image, to obtain fused feature information;

recognizing, according to a classifier in a recurrent neural network model, matching degrees between the fused feature information and a plurality of attribute type features in the recurrent neural network model, and associating the matching degrees obtained through the recurrent neural network model with label information corresponding to the plurality of attribute type features in the recurrent neural network model, to obtain a first label information set;

recognizing, according to a classifier in the convolutional neural network model, matching degrees between the fused feature information and a plurality of attribute type features in the convolutional neural network model, and associating the matching degrees obtained through the convolutional neural network model with label information corresponding to the plurality of attribute type features in the convolutional neural network model, to obtain a second label information set; and fusing the first label information set and the second label information set, to obtain the attribute type corresponding to the target object in the target video.

In an embodiment, when performing the fusing the first label information set and the second label information set, to obtain the attribute type corresponding to the target object in the target video, the processor 1001 specifically performs the following steps:

performing weighted averaging on the matching degrees associated with the same label information in the first label information set and the second label information set, and associating the matching degrees on which the weighted averaging has been performed with the label information, to obtain a target label information set; and extracting label information associated with a maximum matching degree from the target label information set, and using the extracted label information as the attribute type corresponding to the target object in the target video.

In an embodiment, the processor 1001 further performs the following steps:

obtaining a first sample image and a second sample image;

extracting static structural feature information of the first sample image, recognizing, according to a classifier in the convolutional neural network model, matching degrees between the static structural feature information of the first sample image and a plurality of attribute type features in the convolutional neural network model, and associating the matching degrees obtained through the static structural feature information of the first sample image with label information corresponding to the plurality of attribute type features in the convolutional neural network model, to obtain a third label information set;

extracting static structural feature information of the second sample image, recognizing, according to the classifier in the convolutional neural network model, matching degrees between the static structural feature information of the second sample image and the plurality of attribute type features, and associating the matching degrees obtained through the static structural feature information of the second sample image with the label information corresponding to the plurality of attribute type features in the convolutional neural network model, to obtain a fourth label information set; and determining a model loss value according to the static structural feature information of the first sample image and the third label information set, as well as the static structural feature information of the second sample image, and the fourth label information set, and adjusting a weight of a parameter in the convolutional neural network model according to the model loss value.

In an embodiment, the model loss value includes recognition loss values and a verification loss value.

When performing the determining a model loss value according to the static structural feature information of the first sample image and the third label information set, as well as the static structural feature information of the second sample image and the fourth label information set, the processor 1001 specifically performs the following steps:

generating a recognition loss value of the first sample image according to the third label information set and a sample attribute type corresponding to the first sample image;

generating a recognition loss value of the second sample image according to the fourth label information set and a sample attribute type corresponding to the second sample image;

generating the verification loss value according to the static structural feature information of the first sample image, the sample attribute type corresponding to the first sample image, the static structural feature information of the second sample image, and the sample attribute type corresponding to the second sample image; and generating the model loss value according to the recognition loss value of the first sample image, the recognition loss value of the second sample image, and the verification loss value.

In some embodiments of the present disclosure, a target video including a target object is obtained, a target video frame image is extracted from the target video, a plurality of key point video frames are generated according to key point information of the object and a plurality of video frames in the target video, and the plurality of key point video frames are combined into a key point video frame sequence; dynamic timing feature information of the key point video frame sequence is extracted; static structural feature information of the target video frame image is extracted; and an attribute type corresponding to the target object in the target video is recognized according to the dynamic timing feature information of the key point video frame sequence and the static structural feature information of the target video frame image. Because the target video frame image and the key point video frame sequence may be obtained according to the target video, the dynamic timing feature information and the static structural feature information may be further respectively extracted, and the attribute type corresponding to the target video is further recognized according to the two types of feature information together, the feature types of the target video may be enriched by extracting the dynamic timing feature information and the static structural feature information of the target video, and accuracy of recognizing the facial expression in the target video may be further improved according to the plurality of feature types.

The terminal 1000 described in some embodiments of the present disclosure may perform the descriptions of the image recognition method in the embodiments corresponding to FIG. 3 to FIG. 8, or may perform the descriptions of the image recognition apparatus in the embodiment corresponding to FIG. 9. This is not described herein again. In addition, beneficial effects of using the same methods are not described herein again.

In addition, an embodiment of the present disclosure further provides a non-volatile computer-readable storage medium, and the computer-readable storage medium stores the computer-readable instruction executed by the image recognition apparatus 1 mentioned above. When executing the computer-readable instruction, the processor may perform the descriptions of the image recognition method in the embodiments corresponding to FIG. 3 to FIG. 8. Therefore, details are not described herein again. In addition, beneficial effects of using the same methods are not described herein again. For technical details that are not disclosed in the embodiments of the computer-readable storage medium of the present disclosure, refer to the method embodiments of the present disclosure.

A person of ordinary skill in the art may understand that all or some of the procedures of the methods of the foregoing embodiments may be implemented by a computer-readable instruction instructing relevant hardware. The computer-readable instruction may be stored in a computer readable storage medium. When the computer-readable instruction is executed, the computer-readable instruction may include the procedures of the embodiments of the foregoing methods. The storage medium may be a magnetic disk, an optical disc, a read-only memory (ROM), a random access memory (RAM) or the like. The foregoing disclosure is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An image recognition method, performed by a terminal, and comprising:
   obtaining a target video comprising a target object;
   extracting a target video frame image from the target video;
   generating a key point video frame sequence comprised of a plurality of key point video frames according to key point information of the target object and a plurality of video frames in the target video;
   extracting dynamic timing feature information of the key point video frame sequence by using an RNN model;
   extracting static structural feature information of the target video frame image describing the structure of the target object by using a convolutional neural network model; and
   recognizing an attribute type corresponding to a motion or an expression of the target object presented in the target video according to the dynamic timing feature information of the key point video frame sequence and the static structural feature information of the target video frame image.

2. The method according to claim 1, wherein extracting dynamic timing feature information of the key point video frame sequence comprises:
   extracting key marker areas from the key point video frame sequence;
   obtaining unit key point video frame sequences according to the key marker areas in the plurality of key point video frames;
   inputting the unit key point video frame sequences into the RNN model, to extract dynamic timing feature information; and
   connecting the dynamic timing feature information, to obtain the dynamic timing feature information of the key point video frame sequence.

3. The method according to claim 1, wherein extracting static structural feature information of the target video frame image comprises:
   inputting the target video frame image into the convolutional neural network model; and
   extracting the static structural feature information of the target video frame image through convolution processing and pooling processing of the convolutional neural network model.

4. The method according to claim 1, wherein recognizing the attribute type comprises:
   recognizing, according to a classifier in the RNN model, matching degrees between the dynamic timing feature information of the key point video frame sequence and a plurality of attribute type features in the RNN model, and associating the matching degrees obtained through the dynamic timing feature information of the key point video frame sequence with label information corresponding to the plurality of attribute type features in the RNN model, to obtain a first label information set;
   recognizing, according to a classifier in the convolutional neural network model, matching degrees between the static structural feature information of the target video frame image and a plurality of attribute type features in the convolutional neural network model, and associating the matching degrees obtained through the static structural feature information of the target video frame image with label information corresponding to the plurality of attribute type features in the convolutional neural network model, to obtain a second label information set; and
   fusing the first label information set and the second label information set, to obtain the attribute type corresponding to the target object in the target video.

5. The method according to claim 1, wherein recognizing the attribute type comprises:
   fusing the dynamic timing feature information of the key point video frame sequence and the static structural feature information of the target video frame image, to obtain fused feature information;
   recognizing, according to a classifier in the RNN model, matching degrees between the fused feature information and a plurality of attribute type features in the RNN model, and associating the matching degrees obtained through the RNN model with label information corresponding to the plurality of attribute type features in the RNN model, to obtain a first label information set;
   recognizing, according to a classifier in the convolutional neural network model, matching degrees between the fused feature information and a plurality of attribute type features in the convolutional neural network model, and associating the matching degrees obtained through the convolutional neural network model with label information corresponding to the plurality of attribute type features in the convolutional neural network model, to obtain a second label information set; and
   fusing the first label information set and the second label information set, to obtain the attribute type corresponding to the target object in the target video.

6. The method according to claim 4, wherein fusing the first label information set and the second label information set, to obtain the attribute type comprises:
   performing weighted averaging on the matching degrees associated with the first label information set and the second label information set to obtain a target label information set; and
   extracting label information from the target label information set to obtain extracted label information, and using the extracted label information as the attribute type.

7. The method according to claim 3, further comprising:
   obtaining a first sample image and a second sample image;
   extracting static structural feature information of the first sample image;
   extracting static structural feature information of the second sample image; and
   determining a model loss value according to the static structural feature information of the first sample image and the static structural feature information of the second sample image.

8. The method according to claim 7, wherein determining the model loss values comprises:
   generating a first recognition loss value of the first sample image;
   generating a second recognition loss value of the second sample image;

generating a verification loss value according to the static structural feature information of the first sample image and the static structural feature information of the second sample image; and generating the model loss value according to the first recognition loss value of the first sample image, the second recognition loss value of the second sample image, and the verification loss value.

9. An image recognition apparatus, comprising: a memory and a processor coupled to the memory, the processor being configured to:

obtain a target video comprising a target object;

extract a target video frame image from the target video;

generate a key point video frame sequence comprised of a plurality of key point video frames according to key point information of the target object and a plurality of video frames in the target video;

extract dynamic timing feature information of the key point video frame sequence by using an RNN model;

extract static structural feature information of the target video frame image describing the structure of the target object by using a convolutional neural network model; and recognize an attribute type corresponding to a motion or an expression of the target object presented in the target video according to the dynamic timing feature information of the key point video frame sequence and the static structural feature information of the target video frame image.

10. The apparatus according to claim 9, wherein the processor is further configured to:

extract key marker areas from the key point video frame sequence;

obtaining unit key point video frame sequences according to the key marker areas in the plurality of key point video frames;

input the unit key point video frame sequences into the RNN model, to extract dynamic timing feature information; and connect the dynamic timing feature information to obtain the dynamic timing feature information of the key point video frame sequence.

11. The apparatus according to claim 9, wherein the processor is further configured to:

input the target video frame image into the convolutional neural network model; and extract the static structural feature information of the target video frame image through convolution processing and pooling processing of the convolutional neural network model.

12. The apparatus according to claim 9, wherein the processor is further configured to:

recognize, according to a classifier in the RNN model, matching degrees between the dynamic timing feature information of the key point video frame sequence and a plurality of attribute type features in the RNN model, and associate the matching degrees obtained through the dynamic timing feature information of the key point video frame sequence with label information corresponding to the plurality of attribute type features in the RNN model, to obtain a first label information set;

recognize, according to a classifier in the convolutional neural network model, matching degrees between the static structural feature information of the target video frame image and a plurality of attribute type features in the convolutional neural network model, and associate the matching degrees obtained through the static structural feature information of the target video frame image with label information corresponding to the plurality of attribute type features in the convolutional neural network model, to obtain a second label information set; and fuse the first label information set and the second label information set, to obtain the attribute type corresponding to the target object in the target video.

13. The apparatus according to claim 9, wherein the processor is further configured to:

fuse the dynamic timing feature information of the key point video frame sequence and the static structural feature information of the target video frame image, to obtain fused feature information;

recognize, according to a classifier in the RNN model, matching degrees between the fused feature information and a plurality of attribute type features in the RNN model, and associate the matching degrees obtained through the RNN model with label information corresponding to the plurality of attribute type features in the RNN model, to obtain a first label information set;

recognize, according to a classifier in the convolutional neural network model, matching degrees between the fused feature information and a plurality of attribute type features in the convolutional neural network model, and associate the matching degrees obtained through the convolutional neural network model with label information corresponding to the plurality of attribute type features in the convolutional neural network model, to obtain a second label information set; and fuse the first label information set and the second label information set, to obtain the attribute type corresponding to the target object in the target video.

14. The apparatus according to claim 12, wherein the processor is further configured to:

perform weighted averaging on the matching degrees associated with the first label information set and the second label information set to obtain a target label information set; and extract label information from the target label information set to obtain extracted label information, and use the extracted label information as the attribute type.

15. The apparatus according to claim 11, wherein the processor is further configured to:

obtain a first sample image and a second sample image;

extract static structural feature information of the first sample image;

extract static structural feature information of the second sample image; and determine a model loss value according to the static structural feature information of the first sample image and the static structural feature information of the second sample image.

16. The apparatus according to claim 15, wherein the processor is further configured to:

generate a first recognition loss value of the first sample image;

generate a second recognition loss value of the second sample image;

generate a verification loss value according to the static structural feature information of the first sample image and the static structural feature information of the second sample image; and generate the model loss value according to the first recognition loss value of the first sample image, the second recognition loss value of the second sample image, and the verification loss value.

17. A non-transitory computer-readable storage medium, storing a computer-readable instruction, the computer-readable instruction, when executed by one or more processors, causing the one or more processors to perform:

obtaining a target video comprising a target object;

extracting a target video frame image from the target video;

generating a key point video frame sequence comprised of a plurality of key point video frames according to key point information of the target object and a plurality of video frames in the target video;

extracting dynamic timing feature information of the key point video frame sequence by using an RNN model;

extracting static structural feature information of the target video frame image describing the structure of the target object by using a convolutional neural network model; and recognizing an attribute type corresponding to the target object in the target video according to the dynamic timing feature information of the key point video frame sequence and the static structural feature information of the target video frame image.

18. The storage medium according to claim 17, wherein the computer-readable instruction further causes the one or more processors to perform:

extracting key marker areas from the key point video frame sequence;

obtaining unit key point video frame sequences according to the key marker areas in the plurality of key point video frames;

inputting the unit key point video frame sequences into the RNN model, to extract dynamic timing feature information; and connecting the dynamic timing feature information to obtain the dynamic timing feature information of the key point video frame sequence.

19. The storage medium according to claim 17, wherein recognizing the attribute type comprises:

recognizing, according to a classifier in the RNN model, matching degrees between the dynamic timing feature information of the key point video frame sequence and a plurality of attribute type features in the RNN model, and associating the matching degrees obtained through the dynamic timing feature information of the key point video frame sequence with label information corresponding to the plurality of attribute type features in the RNN model, to obtain a first label information set;

recognizing, according to a classifier in the convolutional neural network model, matching degrees between the static structural feature information of the target video frame image and a plurality of attribute type features in the convolutional neural network model, and associating the matching degrees obtained through the static structural feature information of the target video frame image with label information corresponding to the plurality of attribute type features in the convolutional neural network model, to obtain a second label information set; and fusing the first label information set and the second label information set, to obtain the attribute type corresponding to the target object in the target video.

20. The storage medium according to claim 17, wherein recognizing the attribute type comprises:

fusing the dynamic timing feature information of the key point video frame sequence and the static structural feature information of the target video frame image, to obtain fused feature information;

recognizing, according to a classifier in the RNN model, matching degrees between the fused feature information and a plurality of attribute type features in the RNN model, and associating the matching degrees obtained through the RNN model with label information corresponding to the plurality of attribute type features in the RNN model, to obtain a first label information set;

recognizing, according to a classifier in the convolutional neural network model, matching degrees between the fused feature information and a plurality of attribute type features in the convolutional neural network model, and associating the matching degrees obtained through the convolutional neural network model with label information corresponding to the plurality of attribute type features in the convolutional neural network model, to obtain a second label information set; and fusing the first label information set and the second label information set, to obtain the attribute type corresponding to the target object in the target video.

\* \* \* \* \*